(12) United States Patent
Chen et al.

(10) Patent No.: US 7,316,007 B2
(45) Date of Patent: Jan. 1, 2008

(54) OPTIMIZATION OF N-BASE TYPED ARITHMETIC EXPRESSIONS

(75) Inventors: Zhiqun Chen, Palo Alto, CA (US); Judith E. Schwabe, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 682 days.

(21) Appl. No.: 10/686,513

(22) Filed: Oct. 14, 2003

(65) Prior Publication Data

US 2004/0073894 A1  Apr. 15, 2004

Related U.S. Application Data

(63) Continuation of application No. 10/002,437, filed on Nov. 1, 2001, now Pat. No. 6,687,898, which is a continuation of application No. 09/439,113, filed on Nov. 12, 1999, now Pat. No. 6,363,523.

(51) Int. Cl.
*G06F 9/45* (2006.01)

(52) U.S. Cl. .................................................. 717/136
(58) Field of Classification Search ................. 717/136
See application file for complete search history.

(56) References Cited

U.S. PATENT DOCUMENTS 3,805,045 A   4/1974   Larsen (Continued)

FOREIGN PATENT DOCUMENTS

EP   0 778 522 A2   6/1997

(Continued)

OTHER PUBLICATIONS

Jags, "cs510jip Compressed Data Loader", Jags_report, May 21, 1998, pp. 1-9, Retrieved online Dec. 16, 2005 from URL:<http://www.cs.pdx.edu/~apt/cs510jip_1998/jags_report/report.html>.

(Continued)

*Primary Examiner*—John Chavis
(74) *Attorney, Agent, or Firm*—Gunnison, McKay & Hodgson, L.L.P.; Forrest Gunnison

(57) ABSTRACT

A method for arithmetic expression optimization includes receiving a first instruction defined for a first processor having a first base, the first instruction including an operator and at least one operand, converting the first instruction to a second instruction optimized for a second processor having a second base when all operands do not carry potential overflow or when the operator is insensitive to overflow, the second base being smaller than the first base, and converting to a wider base a third instruction that is the source of the overflow when the at least one operand the potential for overflow and when the operator is sensitive to overflow. An apparatus for arithmetic expression optimization includes at least one memory having program instructions and at least one processor configured to use the program instructions to receive a first instruction defined for a first processor having a first base, convert the first instruction to a second instruction optimized for a second processor having a second base when every one of the at least one operand does not carry potential overflow or when the operator is insensitive to overflow, the second base being smaller than the first base, and convert to a wider base a third instruction that is the source of the overflow when the at least one operand the potential for overflow and when the operator is sensitive to overflow.

82 Claims, 23 Drawing Sheets

U.S. PATENT DOCUMENTS

| | | | |
|---|---|---|---|
| 3,993,891 | A | 11/1976 | Beck et al. |
| 4,400,769 | A | 8/1983 | Kaneda et al. |
| 4,504,924 | A | 3/1985 | Cook et al. |
| 5,107,451 | A | 4/1992 | Houk ..................... 364/746 |
| 5,301,341 | A | 4/1994 | Vassiliadis et al. ......... 395/800 |
| 5,305,456 | A | 4/1994 | Boitana |
| 5,408,670 | A | 4/1995 | Davies |
| 5,418,959 | A | 5/1995 | Smith et al. ............... 395/700 |
| 5,446,901 | A | 8/1995 | Owicki et al. |
| 5,497,340 | A | 3/1996 | Uramoto et al. |
| 5,606,677 | A | 2/1997 | Balmer et al. |
| 5,668,999 | A | 9/1997 | Gosling |
| 5,724,279 | A | 3/1998 | Benaloh et al. |
| 5,732,263 | A | 3/1998 | Havens et al. |
| 5,740,441 | A | 4/1998 | Yellin et al. ............... 395/704 |
| 5,784,553 | A | 7/1998 | Kolawa et al. |
| 5,794,049 | A | 8/1998 | Lindholm |
| 5,802,373 | A * | 9/1998 | Yates et al. ................ 717/139 |
| 5,809,306 | A | 9/1998 | Suzuki et al. ............... 395/705 |
| 5,825,407 | A | 10/1998 | Cowe et al. .................... 348/6 |
| 5,878,266 | A | 3/1999 | Goddard et al. ....... 395/800.23 |
| 5,884,316 | A | 3/1999 | Bernstein et al. |
| 5,920,720 | A | 7/1999 | Toutonghi et al. |
| 5,946,483 | A | 8/1999 | Boutaud et al. ............ 395/564 |
| 5,999,731 | A | 12/1999 | Yellin et al. |
| 6,003,038 | A | 12/1999 | Chen |
| 6,014,723 | A * | 1/2000 | Tremblay et al. .............. 711/1 |
| 6,026,237 | A | 2/2000 | Berry et al. |
| 6,075,863 | A | 6/2000 | Krishnan et al. |
| 6,091,897 | A * | 7/2000 | Yates et al. ................. 717/138 |
| 6,092,147 | A | 7/2000 | Levy et al. |
| 6,093,216 | A | 7/2000 | Adi-Tabatabai et al. |
| 6,151,618 | A | 11/2000 | Wahbe et al. .................. 718/1 |
| 6,182,158 | B1 | 1/2001 | Kougiouris et al. |
| 6,202,143 | B1 * | 3/2001 | Rim ........................... 712/210 |
| 6,212,633 | B1 | 4/2001 | Levy et al. |
| 6,247,116 | B1 * | 6/2001 | Abdallah et al. ........... 712/221 |
| 6,247,174 | B1 | 6/2001 | Santhanam et al. ......... 717/154 |
| 6,308,317 | B1 | 10/2001 | Wilkinson et al. ............. 717/5 |
| 6,363,523 | B1 | 3/2002 | Chen et al. ................. 717/153 |
| 6,477,702 | B1 | 11/2002 | Yellin et al. |
| 2002/0023954 | A1 | 2/2002 | Calder et al. ............... 235/381 |
| 2003/0028572 | A1 | 2/2003 | Hoskote et al. ............. 708/495 |

FOREIGN PATENT DOCUMENTS

| | | | |
|---|---|---|---|
| FR | WO 01/14958 | 3/2001 | |

OTHER PUBLICATIONS

Glossner et al., "Delft-Java Dynamic Translation", *Euromicro Conference, 1999. Proceedings*, IEEE Computer Society, Los Alamitos, CA, Sep. 8, 1999, pp. 57-62. (XP010352195).

Wallach et al., "ASHs: Application-Specific Handlers for High-Performance Messaging", *IEEE/ACM Transactions on Networking*, vol. 5, No. 4, IEEE/ACM, New York, NY, Aug. 1997, pp. 460-474. (XP011039087).

McDermott et al., "Smart Card: Java—Java and Smart Cards", Aug. 27, 1999, pp. 1-2 [Online]. Retrieved on Nov. 20, 2006 from the Internet: <URL:http://web.archive.org/web/19990827234400/http://web.mit.edu/ecom/Spring1997/gr12/6JAVA.HTM>. (XP002208203).

Sun Microsystems, Inc., Java Card™ 20. Developer's Guide, Aug. 19, 1998, Revision 1.12.

Sun Microsystems, Inc., "Java Card™ 2.0 Application Programming Interfaces", Oct. 13, 1997, Rev. 1.0.

Sun Microsystems, Inc., "Java Card™ 2.0 Language Subset and Virtual Machine Specification", Oct. 13, 1997, Revision 1.0 Final.

Sun Microsystems, Inc., "Java Card™ 2.0 Programming Concepts", Oct. 15, 1997, Rev. 1.0 Final.

Sun Microsystems, Inc., "Java Card™ 2.1 Application Programming Interface", Jun. 7, 1999, Final Rev. 1.1.

Sun Microsystems, Inc., "Java Card™ 2.1 Runtime Environment (JCRE) Specification", Jun. 7, 1999, Final Revision 1.1.

Sun Microsystems, Inc., "JavaCard™ 2.1 Virtual Machine Specification", Jun. 7, 1999, Final Rev. 1.1.

Sun Microsystems, Inc., "Release Notes—Java Card™ 2.1 Specifications", Jun. 7, 1999, Final Rev. 1.1.

Sun Microsystems, Inc., "Java Check™ 3.0 Frequently Asked Questions", printed from http://java.sun.com/products/personaljava/jcheckfaq30-beta.html, on Dec. 3, 1999.

Sun Microsystems, Inc., "Java Check™ Technical Notice", printed from http://java.sun.com/products/personaljava/JcheckTechNotice.html, on Dec. 3, 1999.

Sun Microsystems, Inc., "Using Java Check™", Version 2.0.1, printed from www.sun.com/software/personaljava/techinfo.html, on Dec. 3, 1999.

Sun Microsystems, Inc., "Using Java Check™", Version 3.0, printed from http://java.sun.com/cgi-bin/download2.cgi, on Dec. 3, 1999.

Sun Microsystems, Inc., "The K Virtual Machine (KVM)", White Paper Jun. 8, 1999.

Ritchey, Tim, "Advanced Topics: The Java Virtual Machine" *JAVA!*, Chapter 14, pp. 25-346, Sep. 22, 1995.

Daniels, John et al., "Strategies For Sharing Objects In Distributed Systems", JOOP, Object Designers Ltd. UK, pp. 27-36, no data find.

Michael Shuttle et al., "Exact Rounding of Certain Elementary Functions", Jun. 29, 1993, pp. 138-145.

Ziv, Abraham, "Fast Evaluation of Elementary Mathematical Functions with Correctly Rounded Last Bit", Sep. 1, 1991, pp. 410-423.

George E. Necula et al., "Proof Carrying Code", Nov. 1996, pp. 1-60.

* cited by examiner

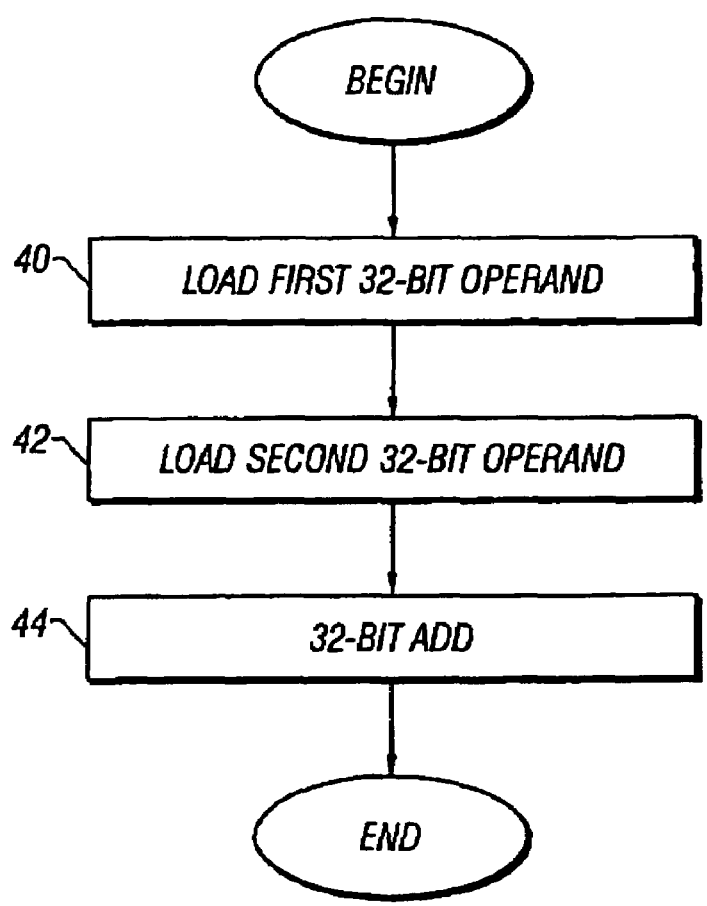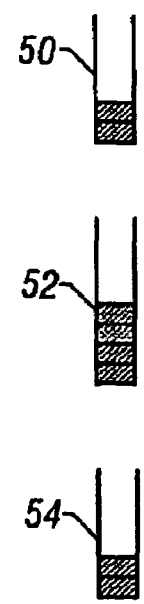
FIG. 3B
FIG. 3A

| Desktop Computer | Resource-Constrained Device |
|---|---|
| short a = 0x7FFF;<br>short b = 1;<br>short c = 1;<br><br>result = a [ int-type add] b;<br>    = 0x00007FFF + 1<br>    = 0x00008000<br>    = 32768 | short a = 0x7FFF;<br>short b = 1;<br>short c = 1;<br><br>result = a [ short-type add] b;<br>    = 0x7FFF + 1<br>    = 0x8000<br>    = -32768 |
| FIG. 5A | FIG. 5B |

| | |
|---|---|
| result = (short) a [ int-type add] b<br>    = (short) (0x00007FFF + 1)<br>    = (short) (0x00008000)<br>    = 0xFFFF8000<br>    = -32768 | result = (short) a [ short-type add] b<br>    = (short) (0x7FFF +1)<br>    = (short) (0x8000)<br>    = -32768 |
| FIG. 6A | FIG. 6B |

$$result = (short)\ (a\ [\ int\text{-}type\ add]\ b$$
$$[int\text{-}type\ add]\ c)$$
$$= (short)\ (0x00007FFF + 1 + 1)$$
$$= (short)\ (0x00008001)$$
$$= 0xFFFF8001$$
$$= -32767$$

FIG. 7A

$$result = (short)\ (a\ [\ short\text{-}type\ add]\ b$$
$$[\ short\text{-}type\ add]\ c)$$
$$= (short)\ (0x7FFF + 1 + 1)$$
$$= (short)\ (0x8001)$$
$$= -32767$$

FIG. 7B

$$result = a\ [\ int\text{-}type\ add]\ b$$
$$[\ int\text{-}type\ divide]\ c$$
$$= (0x00007FFF + 1)\ /\ 2$$
$$= 0x00008000\ /\ 2$$
$$= 0x00004000$$
$$= 16384$$

FIG. 8A

$$result = a\ [short\text{-}type\ add]\ b$$
$$[\ short\text{-}type\ divide]\ c$$
$$= (0x7FFF + 1)\ /\ 2$$
$$= 0x8000\ /\ 2$$
$$= 0xC000$$
$$= -16384$$

FIG. 8B

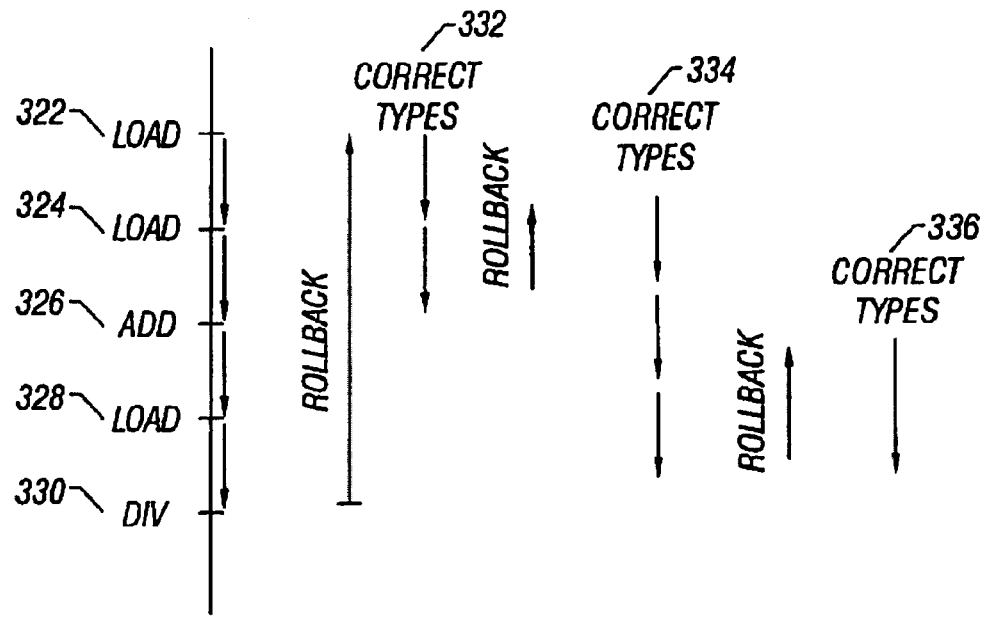
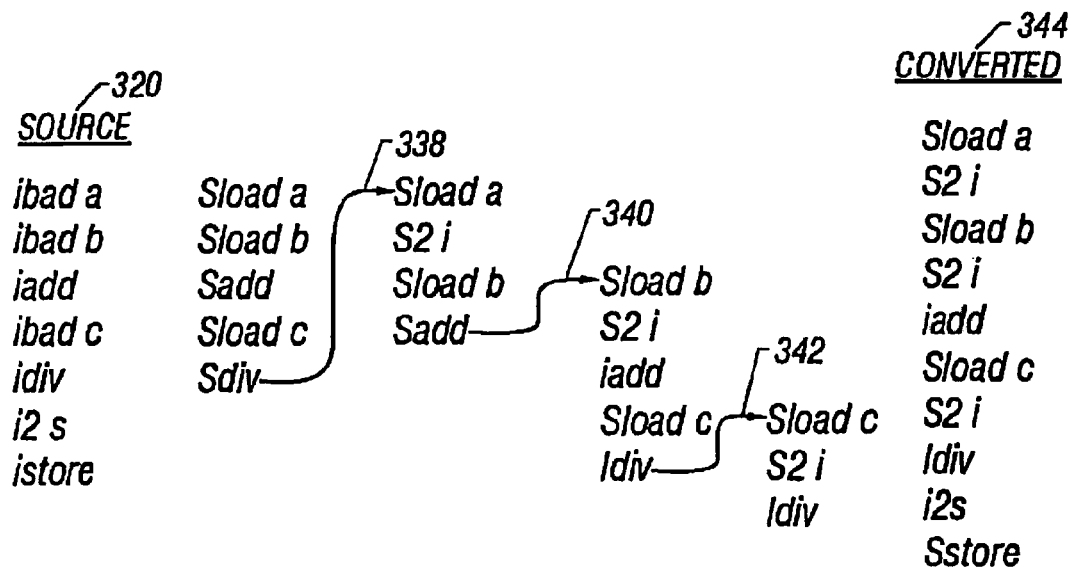
FIG. 22B

OPTIMIZATION OF N-BASE TYPED ARITHMETIC EXPRESSIONS

CROSS-REFERENCE TO RELATED APPLICATIONS

This application is a continuation of U.S. patent application Ser. No. 10/002,437, entitled "Optimization Of N-Base Typed Arithmetic Expressions," by Zhiqun Chen and Judy Schwabe, filed on Nov. 1, 2001, now U.S. Pat. No. 6,687,898 B2, which is a continuation of application Ser. No. 09/439,113, now U.S. Pat. No. 6,363,523, entitled "Optimization Of N-Base Type Arithmetic Expressions," by Zhiqun Chen and Judith Schwabe filed on Nov. 12, 1999 now U.S. Pat. No. 6,363,523.

This application is related to the following:

U.S. patent application Ser. No. 09/243,101, entitled "Object-Oriented Instruction Set For Resource Constrained Devices", by Joshua Susser and Judith Schwabe, filed on Feb. 2, 1999, commonly assigned herewith;

U.S. patent application Ser. No. 10/664,216, entitled "Virtual Machine With Securely Distributed Bytecode Verification", by Moshe Levy and Judith Schwabe, filed on Sep. 16, 2003, commonly assigned herewith, which is a continuation of application Ser. No. 10/283,305, now U.S. Pat. No. 6,640,279, entitled "Virtual Machine With Securely Distributed Bytecode Verification", by Moshe Levy and Judith Schwabe, filed on Oct. 30, 2002, which is a continuation of application Ser. No. 09/547,225, now U.S. Pat. No. 6,546,454, entitled "Virtual Machine With Securely Distributed Bytecode Verification", by Moshe Levy and Judith Schwabe, filed on Apr. 11, 2000, which is a continuation of application Ser No. 08/839,621, now U.S. Pat. No. 6,092,147, entitled "Virtual Machine With Securely Distributed Bytecode Verification", by Moshe Levy and Judith Schwabe, filed on Apr. 15, 1997;

U.S. patent application Ser. No. 10/712,463, entitled "Optimization of N-Base Typed Arithmetic Instructions Via Rework", by Judith Schwabe and Zhiqun Chen, filed on Nov. 12, 2003, now U.S. Pat. No. 7,010,786, commonly assigned herewith; and U.S. Patent Application Ser. No. 10/712,475, entitled "Predictive Arithmetic Overflow Detection", by Judith Schwabe and Zhiqun Chen, filed on Nov. 12, 2003, commonly assigned herewith; and U.S. patent application Ser. No. 10/712,918, entitled "Overflow Sensitive Arithmetic Instruction Optimization Using Chaining", by Judith Schwabe, filed on Nov. 12, 2003, commonly assigned herewith;

U.S. patent application Ser. No. 10/712,919, entitled "Overflow Predictive Arithmetic Instruction Optimization Using Chaining", by Judith Schwabe and Zhiqun Chen, filed on Nov. 12, 2003, now U.S. Pat. No. 7,107,581 commonly assigned herewith.

BACKGROUND OF THE INVENTION

1. Field of the Invention

The present invention relates to computer systems. More particularly, the present invention relates to the optimization of n-base typed arithmetic expressions.

2. Background

Preparation of a computer program is illustrated in FIG. 1. The user writes programs in a high-level programming language 10. The programs written in the high-level program language 10 are compiled into a low-level machine language 12, which can be executed by the targeted machine. For example, programs written in the high-level Java™ programming language are compiled into low level bytecode instructions. The bytecode instructions are the machine language for a Java™ Virtual Machine. The Java™ Virtual Machine Specification is described in Lindholm et al., "The Java™ Virtual Machine Specification", 1999, Addison Wesley, Second Edition.

Typical high-level programming languages support arithmetic expressions. Arithmetic expressions are defined by an arithmetic operator that operates on one or more operands. Operators typically supported include addition, subtraction, multiplication, division, remainder, negate, shift, bitwise OR, bitwise AND and bitwise exclusive OR. Intermediate values are the results of one or more arithmetic operations.

High-level languages also typically support multiple or n-base integral types and arithmetic operations are overloaded. Overloading allows operators to accept operands having mixed types. For example, the Java™ programming language supports four base integral types: byte, short, int and long. These types support 8-, 16-, 32- and 64-bit values, respectively. Operators such as the "+" operator may accept operands of any of these integral types. The three examples below illustrate overloading the "+" operator for operations on operands having mixed base types.

int a, b;
a+b;
short a, b;
a+b;
byte a, b;
a+b;

This overloading is typically performed by widening values to a wider base type and then performing the arithmetic operation. For example, C and Java™ compilers typically widen values of type byte and short to type int. In the Java™ language, type int is always 32 bits. Thus, 16-bit values of type short and 8-bit values of type byte are widened to the 32-bit type int before performing the arithmetic operation. In the Java™ language, the following byte code is generated for each of the three examples listed above:

iload a
iload b
iadd

The iload instructions loads any of the 8, 16 or 32-bit variables and puts a 32-bit operand on the stack. The iadd instruction pops two 32-bit operands off the stack, adds them and puts the 32-bit result back on the stack.

Unlike Java™, some high-level languages define only the relationship between the integral types, and not the size of each type. For example, one C compiler vendor may define the bit sizes of types byte, short and int to be 8, 16 and 32 bits, respectively. However, another C compiler vender may define the sizes of the same types to be 16, 32 and 64 bits, respectively. Yet another compiler may define the bit sizes to be 16, 32 and 32 bits, respectively. In all cases, the relationship between the sizes of each type is maintained (number of values represented by type byte<number of values represented by type short, number of values represented by type short<number values represented by type int), but the actual number of bits used to represent each type may differ. Like Java™, however, C performs arithmetic operations in the size of the int type defined by each particular compiler. This requires widening values having a smaller base type to type int.

This type widening approach reduces the number of machine instructions, thus reducing the complexity of the target machine. However, this type widening typically requires more computational stack space. For example, adding two 16-bit values of type short after they have been widened to the 32-bit type uses the same amount of stack space as adding two 32-bit values of type int, as illustrated in FIGS. 2A and 2B.

Turning now to FIG. 2A, a flow diagram that illustrates stack usage when adding two 16-bit values of type short in the Java™ language is illustrated. At reference numeral 20, the first 16-bit operand is loaded and pushed onto the operand stack. The operand stack at this point is illustrated by reference numeral 30. At reference numeral 22, the first 16-bit operand is expanded to 32 bits. At reference numeral 24, the second 16-bit operand is loaded and pushed onto the operand stack. At reference numeral 26, the second 16-bit operand is expanded to 32 bits. At this point, the operand stack occupies 4×16=64 bits. At reference numeral 28, the two 32-bit operands are added using a 32-bit add operator.

Turning now to FIG. 3A, a flow diagram that illustrates stack usage when adding two 32-bit values of type int is presented. At reference numeral 40, the first 32-bit operand is loaded and pushed onto the operand stack. The operand stack is illustrated by FIG. 3B. At reference numeral 42, the second 32-bit operand is loaded and pushed onto the operand stack. At reference numeral 44, the two 32-bit operands are added using a 32-bit add operator. Thus, in both the 16-bit add and the 32-bit add examples above, two 32-bit operands are pushed onto the stack before being popped off the stack and added using a 32-bit add operation.

During the course of program execution, the stack size may vary in size due to factors such as the level of nested procedure calls, the complexity of computed expressions and the number of locally declared variables. On resource-constrained devices such as smart cards, there is typically insufficient memory available to perform such computations where type widening takes place.

Resource-constrained devices are generally considered to be those that are relatively restricted in memory and/or computing power or speed, as compared to typical desktop computers and the like. By way of example, other resource-constrained devices include cellular telephones, boundary scan devices, field programmable devices, personal digital assistants (PDAs) and pagers and other miniature or small footprint devices.

Smart cards, also known as intelligent portable data-carrying cards, generally are made of plastic or metal and have an electronic chip that includes an embedded microprocessor or microcontroller to execute programs and memory to store programs and data. Such devices, which can be about the size of a credit card, have computer chips with 8-bit or 16-bit architectures. Additionally, these devices typically have limited memory capacity. For example, some smart cards have less than one kilo-byte (1K) of random access memory (RAM) as well as limited read only memory (ROM), and/or non-volatile memory such as electrically erasable programmable read only memory (EEPROM).

Furthermore, smart cards with 8-bit or 16-bit architectures typically have built-in 8-bit or 16-bit arithmetic operations, respectively. As such, smart cards can typically perform 8-bit or 16-bit operations more efficiently than 32-bit operations. Performing 32-bit operations on data that has been widened to 32-bits is especially inefficient. Thus, the limited architecture and memory of resource-constrained devices such as smart cards make it impractical or impossible to execute programs where the values have been widened to a larger integral type.

The Java™ Virtual Machine instruction set defines an arithmetic instruction set to handle values of integral types byte, short and int. Variables of type byte and short are widened to the integral type int during compilation. By contrast, the Java Card™ (the smart card that supports the Java™ programming language) Virtual Machine defines a separate instruction set to handle variables of type byte and short, in addition to the instruction set to handle variables of integral type int. Most Java Card™ applications operate on data values of type short or byte.

There is an increasing trend in the computer industry to support high-level computer languages designed for execution on relatively memory-rich desktop computers, such that the same programs can be run on resource-constrained devices, thus achieving interoperability across vertical platforms. This interoperability across vertical platforms requires that programs written in the high-level programming language render the same result when run on resource-constrained devices as they would when ran on relatively memory-rich devices. For example, it is desirable to support execution of programs written in the Java™ programming language on a variety of platforms including smart card platforms, hand-held devices, consumer appliances, desktop computers and supercomputers.

Accordingly, there is a need to transform program representations such that semantically equivalent mathematical expressions can be performed using less computational stack space. Additionally, there is a need in the prior art to perform such transformations such that execution speed is increased.

SUMMARY OF THE INVENTION

A method for arithmetic expression optimization includes receiving a first instruction defined for a first processor having a first base, the first instruction including an operator and at least one operand, converting the first instruction to a second instruction optimized for a second processor having a second base when all operands do not carry potential overflow or when the operator is insensitive to overflow, the second base being smaller than the first base, and converting to a wider base a third instruction that is the source of the overflow when the at least one operand the potential for overflow and when the operator is sensitive to overflow. An apparatus for arithmetic expression optimization includes at least one memory having program instructions and at least one processor configured to use the program instructions to receive a first instruction defined for a first processor having a first base, convert the first instruction to a second instruction optimized for a second processor having a second base when every one of the at least one operand does not carry potential overflow or when the operator is insensitive to overflow, the second base being smaller than the first base, and convert to a wider base a third instruction that is the source of the overflow when the at least one operand the potential for overflow and when the operator is sensitive to overflow.

BRIEF DESCRIPTION OF THE DRAWINGS

FIG. 3A is a flow diagram that illustrates stack usage for adding two 32-bit operands.

FIG. 3B is a block diagram that illustrates stack usage for adding two 32-bit operands.

FIG. 5A is a code sample that illustrates the addition of two values of type short on a desktop computer.

FIG. 5B is a code sample that illustrates the addition of two values of type short on a resource-constrained computer.

FIG. 6A is a code sample that illustrates the addition of two values of type short and immediately casting the result on a desktop computer.

FIG. 6B is a code sample that illustrates immediately casting the result of an operation that potentially carries overflow on a resource-constrained computer.

FIG. 7A is a code sample that illustrates the addition of three values of type short and immediately casting the result on a desktop computer.

FIG. 7B is a code sample that illustrates performing an operation that is not affected by overflow on operands by an operation that the potential for overflow on a resource-constrained computer.

FIG. 8A is a code sample that illustrates the addition of two values of type short and dividing the result by a value of type short on a desktop computer.

FIG. 8B is a code sample that illustrates performing an operation that is affected by overflow on operands created by an operation that the potential for overflow on a resource-constrained computer.

FIG. 22B is a block diagram that illustrates instruction conversion in accordance with one embodiment of the present invention.

DETAILED DESCRIPTION OF THE SPECIFIC EMBODIMENTS

Those of ordinary skill in the art will realize that the following description of the present invention is illustrative only. Other embodiments of the invention will readily suggest themselves to such skilled persons having the benefit of this disclosure.

This invention relates to computer systems. More particularly, the present invention relates to the optimization of n-base typed arithmetic expressions. The invention further relates to machine readable media on which are stored (1) the layout parameters of the present invention and/or (2) program instructions for using the present invention in performing operations on a computer. Such media includes by way of example magnetic tape, magnetic disks, optically readable media such as CD ROMs and semiconductor memory such as PCMCIA cards. The medium may also take the form of a portable item such as a small disk, diskette or cassette. The medium may also take the form of a larger or immobile item such as a hard disk drive or a computer RAM.

Resource-constrained devices are generally considered to be those that are relatively restricted in memory and/or computing power or speed, as compared to typical desktop computers and the like. Although the particular implementation discussed below is described in reference to a smart card, the invention can be used with other resource-constrained devices including, but not limited to, cellular telephones, boundary scan devices, field programmable devices, personal digital assistants (PDAs) and pagers, as well as other miniature or small footprint devices. The invention can also be used on non-resource constrained devices.

For the purpose of this disclosure, the term "processor" may be used to refer to a physical computer or a virtual machine.

Figure 4A:
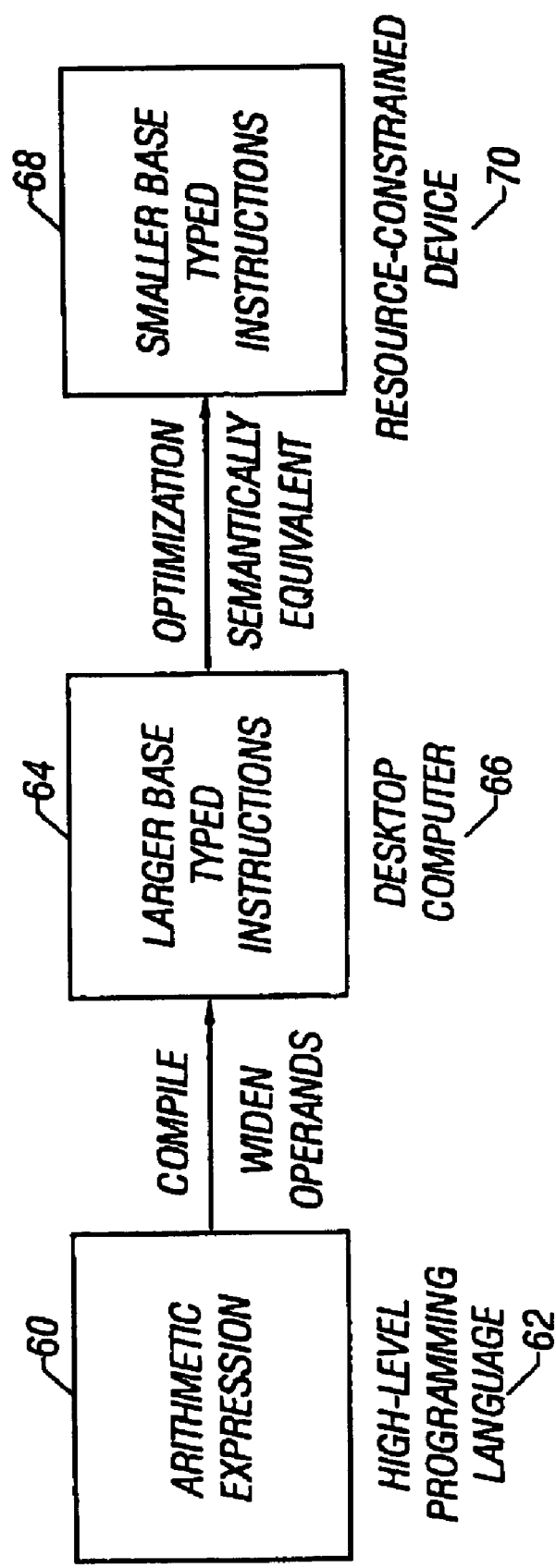
FIG. 4A is a block diagram that illustrates converting arithmetic expressions for execution on a resource-constrained machine according to one embodiment of the present invention.

Turning now to FIG. 4A, a block diagram that illustrates converting arithmetic expressions for execution on a resource-constrained machine according to one embodiment of the present invention is presented. A compiler takes arithmetic expressions 60 written in a high-level language 62 and widens the operands to a larger integral type, creating larger base typed instructions 64 for execution on a typical desktop machine 66; The larger base typed instructions 64 are optimized to semantically equivalent smaller base typed instructions 68 for execution on a resource-constrained machine 70. For example, a short-type addition instruction is used to operate on short-typed operands, and the result is type short.

According to another embodiment of the present invention, the optimization to semantically equivalent smaller base typed instructions is part of a just-in-time code generator. Just before a set of instructions is executed for the first time, the unoptimized instructions are optimized to semantically equivalent smaller base typed instructions for execution on a resource-constrained machine. Subsequent execution of the same set of instructions use the set of optimized instructions.

According to another embodiment of the present invention, when a larger type instruction 64 is required to preserve the semantics of an arithmetic instruction, and larger type instructions are not supported by the target processor, the arithmetic expression is rejected as not supported.

Figure 4B:
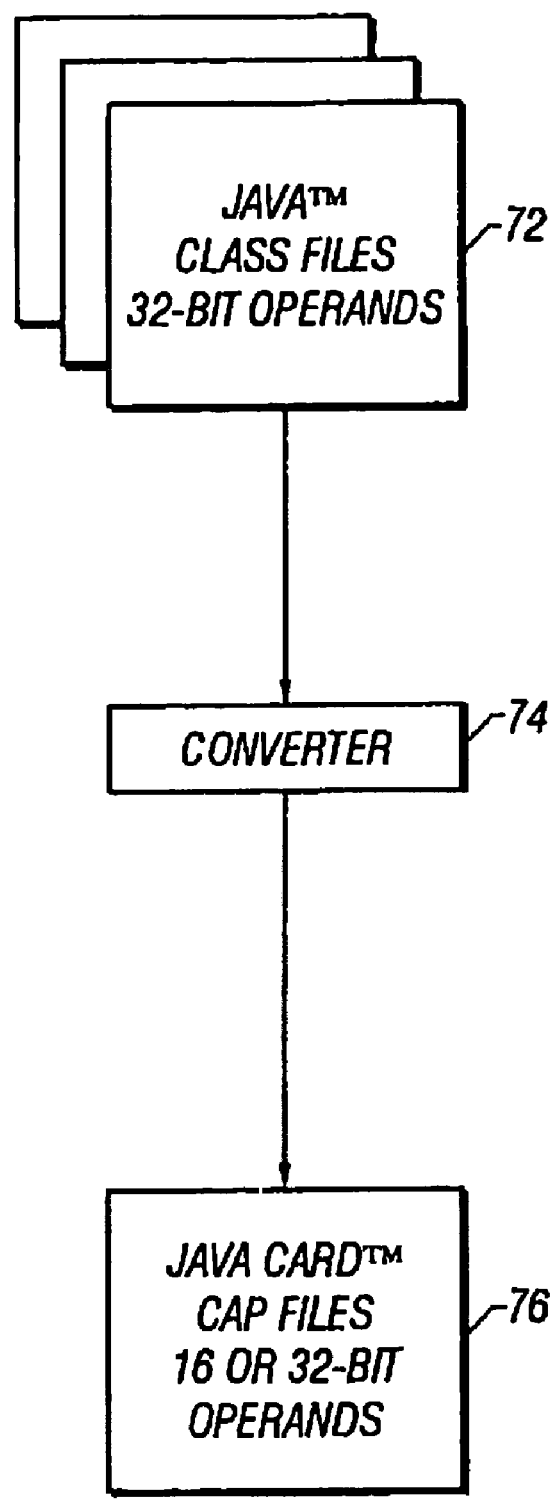
FIG. 4B is a block diagram that illustrates converting Java™ class files in accordance with one embodiment of the present invention.

Turning now to FIG. 4B, a block diagram that illustrates converting instructions in accordance with one embodiment of the present invention is presented. Java™ class files 72 containing instructions with 32-bit operands are received by a Java Card™ class file converter 74. The, converter 74 generates instructions 76 optimized for execution on a resource-constrained device. The optimizations include, by way of example, providing less stack usage, smaller program size and faster execution.

Target machines may support n-typed arithmetic operators. While the Java™ Virtual Machine supports type int operators, the Java Card™ Virtual Machine supports type short operators and optionally supports type int operators. Other devices may support only byte-typed arithmetic operations, or all of byte-, short- and int-typed operations. Typically, relatively less time is required to perform 16-bit arithmetic on an 8-bit or 16-bit processor and relatively more time is required to perform 32-bit arithmetic on the same processor.

Since the actual values used in an arithmetic operation are not known at optimization time, the optimization must assume the worst case value for each operand. The worst case value for an operand is determined based upon the input operand type. A small-type operation can have results that require large-type representation or overflow into a larger type. Thus, according to the present invention, arithmetic operators are categorized into operators affected by overflow and operators with the potential to create overflow. For the purposes of this disclosure, overflow includes the underflow of negative values. The result of a small-type operation is said to carry potential overflow if the operator used to create the result belongs to the group of operators with the potential to create overflow into a large-type representation. Intermediate values are allowed to carry potential overflow as long as the intermediate value is not used as an operand for an operator belonging to the group of operators affected by overflow.

The operators with a potential to create overflow include addition, subtraction, multiplication, division, negate and left shift. The Java™ bytecodes for these operators are shown in Table 1.

TABLE 1

Operations with Potential Overflow

Java™
Bytecode iadd
isub
imul
idiv

TABLE 1-continued

Operations with Potential Overflow

Java™
Bytecode ineg
ishl

The operators affected by overflow are shown in Table 2. The arithmetic operators affected by overflow include division, remainder, negate, right-shift and unsigned right-shift. Non-arithmetic operators affected by overflow include array operations, switch operations and compare operations.

TABLE 2

Operations Affected by Overflow

| Java™ Bytecode | Operation Type | Which Operand(s) Affected by Overflow |
|---|---|---|
| idiv | Arithmetic | both input operands |
| irem | Arithmetic | both input operands |
| ineg | Arithmetic | only has one operand |
| ishr | Arithmetic | operand being shifted only |
| iushr | Arithmetic | operand being shifted only |
| if<*> | Compare | only has one operand |
| if_icmp<*> | Compare | both operands to the compare |
| tableswitch | Switch | switch value |
| lookupswitch | Switch | switch value |
| *newarray | array | number of elements |
| *aload | array | array index |
| *astore | array | array index |

When optimizing Table 1 operations to a smaller type, the result may overflow into the larger type. The result of an expression with one of the operators in Table 2 may lose precision if one of the operands in the expression is an intermediate value and contains potential overflow data. To enable optimization and preserve the semantics of the high-level source code, the potential overflow must be corrected using an explicit source level cast to the type of the result if the result is input to one of the operations in Table 2.

If input operand(s) to any of the operations in Table 2 are the result of an operation in Table 1 and an explicit high level source code cast is not present, optimization cannot occur. Such an erroneous optimization would not guarantee a semantically equivalent result. In other words, the optimized code generated for execution on a resource-constrained device could render a result different than the non-optimized code generated for a desktop computer. For example, overflow data could be present in the Java™ 32-bit representation of the operand(s), but not in the Java Card™ 16-bit representation.

The result of operations with the operators listed in Table 1 may cause overflow if an operator with a smaller type is applied. Examples of these problems associated with optimizing instructions targeted to a desktop computer platform to instructions targeted to a resource-constrained computer platform are provided in FIGS. 5A-8B. The examples assume the desktop computer is based on a 32-bit architecture and is relatively memory rich. The resource-constrained computer is assumed to be based on a 16-bit architecture with relatively little memory. Those of ordinary skill in the art will recognize the invention applies to computing platforms having various architectures.

FIGS. 5A-8B also use signed values. Those of ordinary skill in the art will also recognize that overflow may occur regardless of whether the values are signed or unsigned.

Turning now to FIG. 5A, a code sample that illustrates the addition of two values of type short on a desktop computer is illustrated. The value "a" contains the maximum value that can be represented by a 16-bit signed short type. As described above, even though the values are 16-bit short values, int-type addition is used. Thus, overflow from the 16-bit range to the 32-bit range is present in the result value and the effect of the overflow is to create a larger positive 32-bit number.

Turning now to FIG. 5B, a code sample that illustrates adding the same values as in FIG. 5A on a resource-constrained computer is presented. Since execution is being performed on a resource-constrained computer and both values are 16-bit short types, the instructions are optimized to use short-typed addition, thus using less stack space. However, because 16-bit addition is used instead of 32-bit addition, the addition creates overflow in the sign bit. Whereas the desktop computer computed a value of 32,768, the result computed in the resource-constrained computer example is -32,768, a negative number. This result is unacceptable because it is different from the desktop computer result, preventing interoperability across multiple computer platforms.

Turning now to FIG. 6A, a code sample that illustrates the addition of two values of type short and immediately casting the result is presented. This example is the same as that in FIG. 5A, except that the result of the addition is cast to type short. Casting the type to short truncates the most significant sixteen bits to a short value and sign extends to a 32-bit value. The result of an operation that potentially carries overflow (the add operation) is cast to type short, thereby eliminating any potential overflow problem. FIG. 6B illustrates adding the same values as in FIG. 6A represented as 16-bit values on a resource-constrained computer. The result values for both the desktop computer and the resource-constrained computer are the same.

Turning now to FIG. 7A, a code sample that illustrates the addition of three values of type short on a desktop computer is presented. In the example, int-type addition is used to add 16-bit short values "a" and "b" and-add the result to "c". The final result is cast to a short type.

Turning now to FIG. 7B, a code sample that illustrates performing an operation that is not affected by overflow on operands created by an operation that potentially carries overflow on a resource-constrained computer is presented. Since all values in this example are 16-bit short types, short-typed addition is used for all intermediate additions. As indicated in Table 1, the addition operator potentially creates overflow, but is not affected by overflow. Thus, adding "a" and "b" creates a value that potentially carries overflow. This value is added to "c", creating another value that potentially carries overflow. Although the second add operation contains one operand that potentially carries overflow (the a+b result), the add operation is not affected by operands carrying overflow. The final result is cast to type short, removing the potential overflow from the addition operation. Thus, the result values for both the desktop computer and the resource-constrained computer are the same.

Turning now to FIG. 8A, a code sample that illustrates the addition of two values of type short and dividing the result by a value of type short on a desktop computer is presented. Since execution is being performed on a desktop computer, int-type operations are used. The values "a" and "b" are added together using int-type add. This intermediate value is divided by "c".

Turning now to FIG. 8B, a code sample that illustrates performing an operation that is affected by overflow on operands created by an operation that potentially carries overflow on a resource-constrained computer is presented. Since execution is being performed on a resource-constrained computer, short-type operations are used. The values "a" and "b" are added together using short-type add. The addition creates an intermediate value having overflow from the 16-bit range. This intermediate value is divided by "c". Unlike the addition operator used in FIG. 7B, the division operator is affected by overflow, as shown in Table 2. The 16-bit value is considered to be negative, since the high bit is set. Thus, the desktop computer and resource-constraint computer examples provide different results that have not been corrected by type conversion expressed in the program as in FIGS. 6A-7B.

According to the present invention, arithmetic expressions are optimized using typed instructions that are optimal based upon the types of operands. The optimization process proceeds until a potential overflow problem is encountered. At this point, the input operands of the arithmetic expression are revisited and converted to the next larger typed instructions. This process repeats until the appropriate type of instructions are chosen so that arithmetic expressions render the same result on desktop computers and on resource-constrained devices with optimized instruction sets.

Several relationships are maintained during the conversion process. These relationships relate to instructions and the values that will be produced when executing the instructions on the target machine. The relationship data includes the actual and the desired type for a value. The relationship data also includes the source instruction that will produce the value on the target machine once the instruction is executed on the target machine. Each instruction is also linked to its operand(s) relationship data. Additionally, the relationship data for a result is linked to the instruction(s) that consume the result. Each relationship data is also linked to the instruction (if any) that will cause potential overflow if the instruction is executed on the target machine. This instruction is referred to as a rollback point. Since an erroneous final result may be produced when a value which carries potential overflow is consumed by an operator that is sensitive to overflow, linking each value that will be produced to the instruction that caused the overflow provides a way to roll back to the instruction that caused the overflow problem when the conversion process cannot proceed further.

An intermediate value can be further consumed as an operand in successor instructions. If the intermediate value potentially carries overflow, the rollback instruction is also propagated in the result. This repeats in the course of converting an expression. The rollback action always acts on an.-intermediate value (or operand) and rolls back to the instruction where a re-conversion is required. A method for determining the rollback instruction and other details of the optimization are discussed below.

Figure 9:
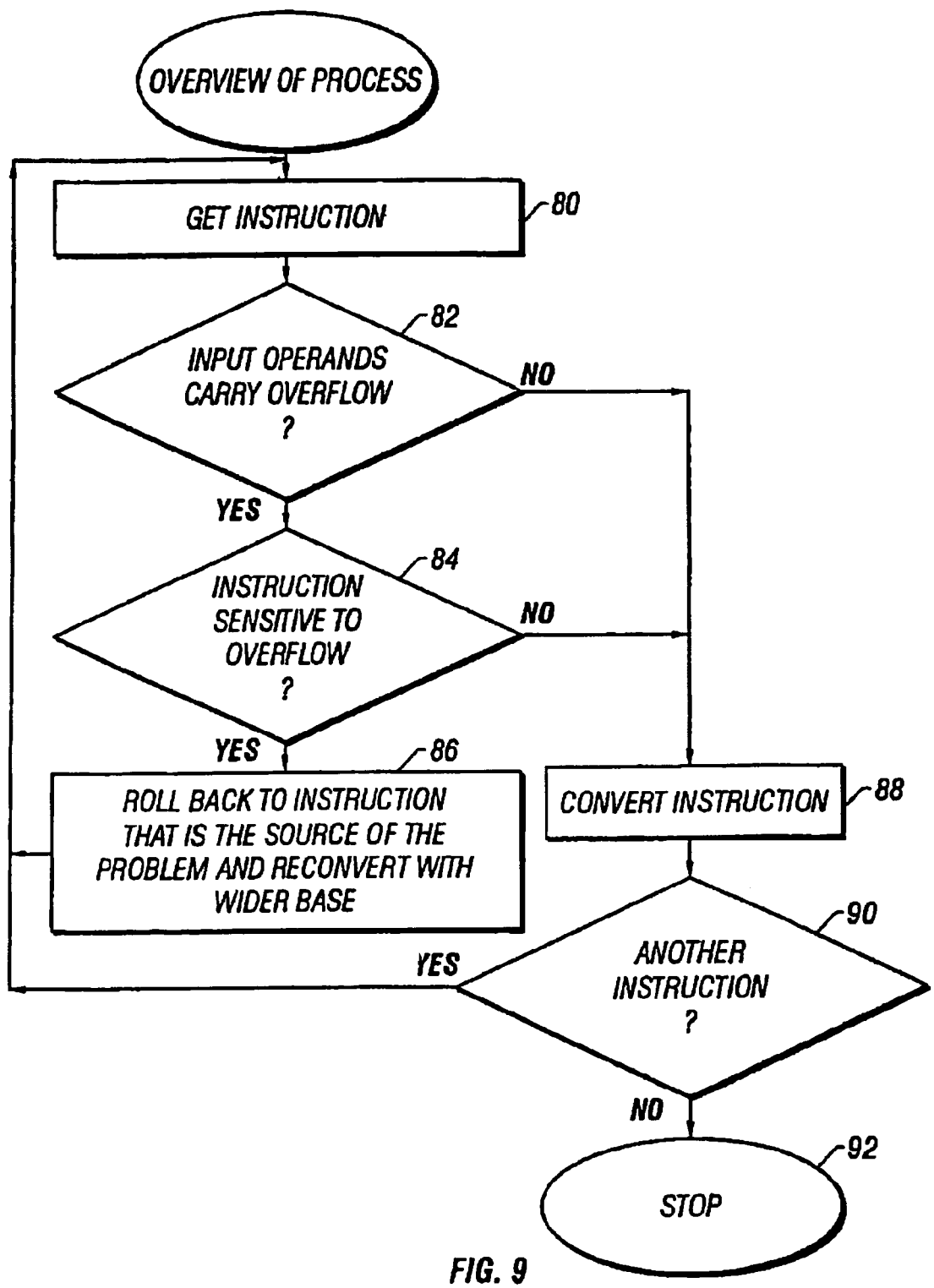
FIG. 9 is a flow diagram that illustrates a method for n-base typed arithmetic expression optimization in accordance with one embodiment of the present invention.

Turning now to FIG. 9, a flow diagram that illustrates n-base typed arithmetic expression optimization in accordance with one embodiment of the present invention is presented. At reference numeral 80, an instruction to be converted is received. At reference numeral 82, a determination is made regarding whether any of the input operands carry potential overflow. If at least one operand carries potential overflow, a determination regarding whether the instruction being converted is sensitive to overflow is made at reference numeral 84. The Java™ bytecodes for these are listed in Table 2. Those of ordinary skill in the art will recognize that the list of operators affected by overflow may vary for different high-level languages, and that this invention may be applied to these other languages as well.

At reference numeral 86, if the instruction being converted is sensitive to overflow, the conversion process is rolled back to the instruction that is the source of the problem and that instruction is converted using a type having a wider base. For example, an 8-bit byte type would be widened-to a 16-bit word type, and a 16-bit word type would be widened to a 32-bit word type. Widening an operand to a larger type requires subsequent instruction conversions of the operand to use instructions tied to the larger type.

If the instruction being converted is insensitive to overflow, or if none of the input operands carry potential overflow, the instruction is converted to the most optimal type for execution on a resource-constrained device at reference numeral 88. At reference numeral 90, a determination is made regarding whether more instructions remain to be converted. If more instructions remain, conversion of the next instruction begins at reference numeral 80. The conversion process ends at reference numeral 92 when the last instruction has been converted.

Figure 10:
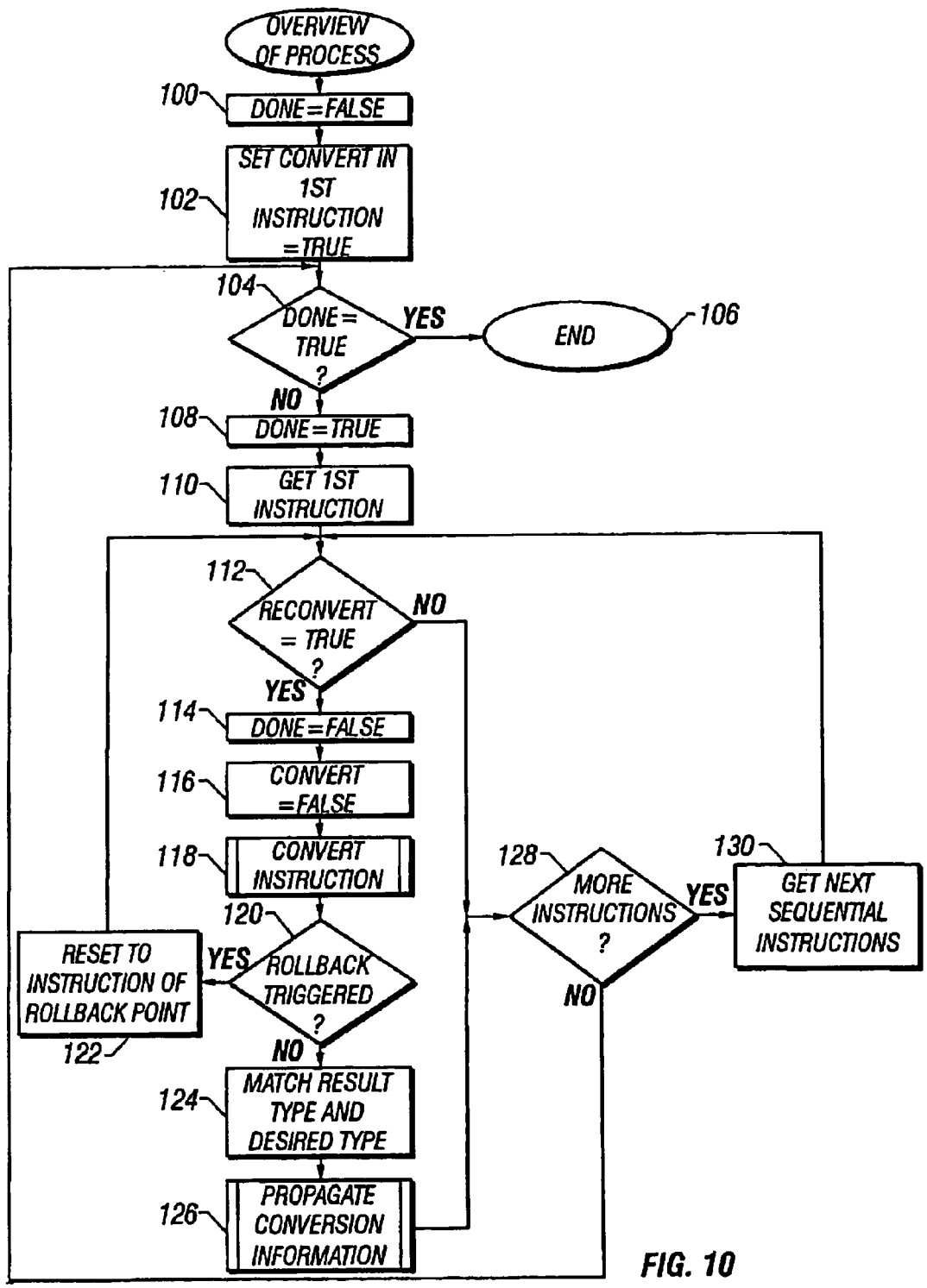
FIG. 10 is a detailed flow diagram that illustrates a method for n-base typed arithmetic expression optimization in accordance with one embodiment of the present invention.

Turning now to FIG. 10, a detailed flow diagram that illustrates n-base typed arithmetic expression optimization in accordance with one embodiment of the present invention is presented. At reference numeral 100, an indication that the conversion is not complete is made. At reference numeral 102, an indication that conversion of the first instruction should be performed is made. At reference numeral 104, whether instruction conversion has been completed is determined. If instruction conversion has been completed, execution terminates at reference numeral 106. If conversion has not been completed, an indication that conversion is complete is made at reference numeral 108. At reference numeral 110, the first instruction is obtained. At reference numeral 112, a determination of whether the instruction should be converted is made.

If the instruction should be converted, an indication that the conversion is not complete and an indication that the current instruction should not be converted again are made at reference numerals 114 and 116, respectively. At reference numeral 118, the instruction is converted to another instruction optimized for a target machine having a smaller base type. At reference numeral 120, a determination is made regarding whether a rollback has been triggered by the conversion at reference numeral 118. If a rollback has been triggered, the instruction at the rollback point is obtained at reference numeral 122 and conversion of the instruction at the rollback point is restarted at reference numeral 104. If rollback is not triggered, the result type and the desired type are matched at reference numeral 124. At reference numeral 126, the conversion information is propagated to successor instructions for each control path.

At reference numeral 128, a determination regarding whether more instructions remain is made. If more instructions remain, the next instruction is obtained at reference numeral 130 and execution continues at reference numeral 112. The conversion process ends when the last instruction has been converted.

Figure 1:
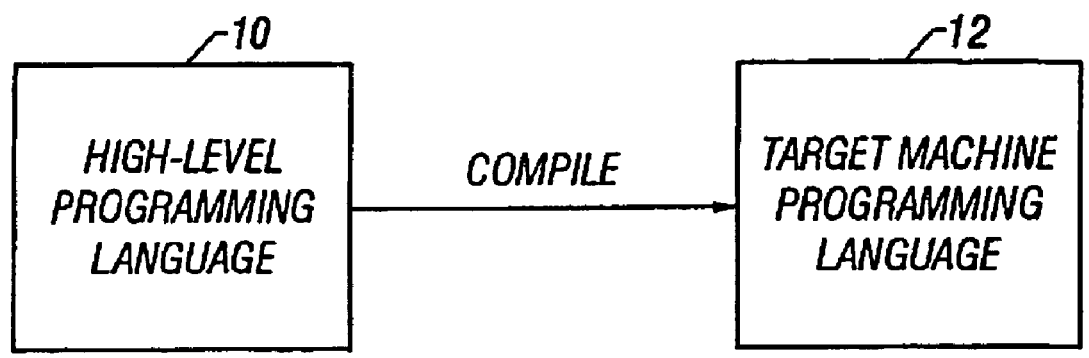
FIG. 1 is a block diagram that illustrates compiling a program written in a high-level language.
Figure 2A:
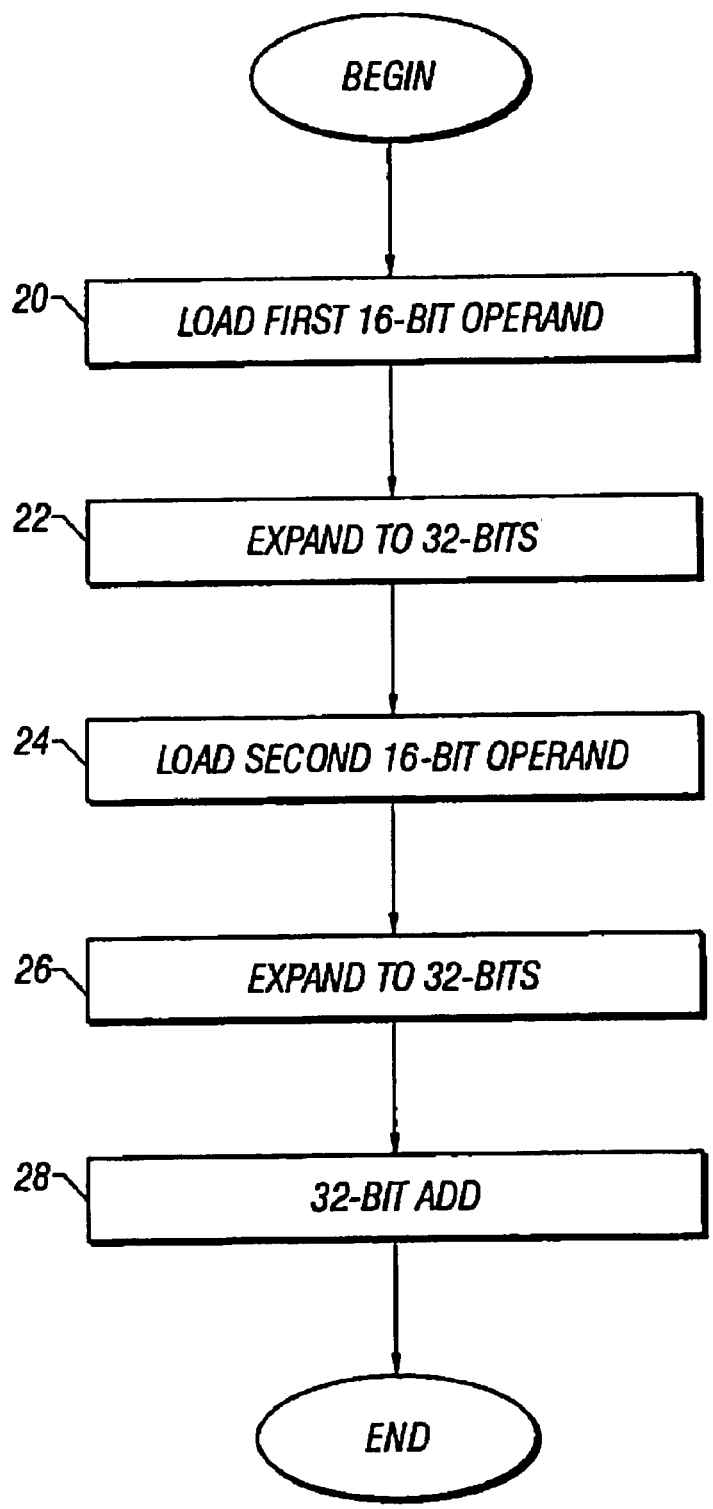
FIG. 2A is a flow diagram that illustrates stack usage for adding two 16-bit operands widened to 32-bits.
Figure 2B:
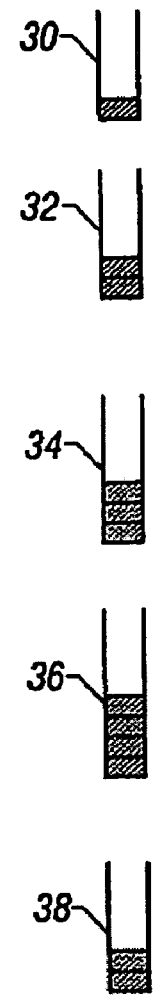
FIG. 2B is a block diagram that illustrates stack usage for adding two 16-bit operands widened to 32-bits.
Figure 11:
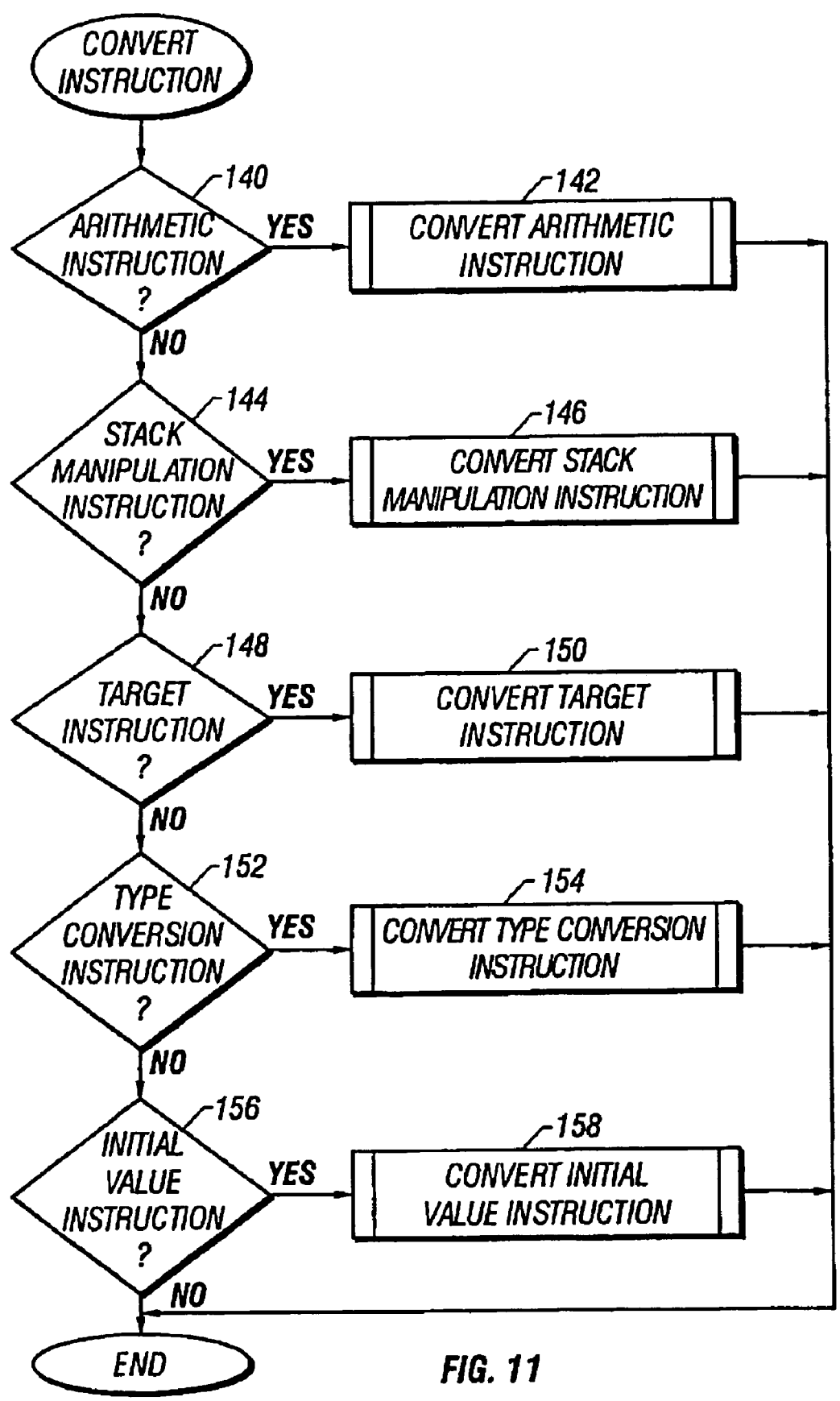
FIG. 11 is a flow diagram that illustrates converting an instruction in accordance with one embodiment of the present invention.

Turning now to FIG. 11, a flow diagram that illustrates converting an instruction in accordance with one embodiment of the present invention is presented. At reference numeral 140, whether the current instruction is an arithmetic instruction is determined. If the instruction is an arithmetic instruction, it is converted at reference numeral 142. Similarly, stack manipulation, target, type conversion and convert initial value instructions are converted at reference numerals 146, 150, 154 and 158, respectively. The classification of instructions according to whether an instruction is an arithmetic, stack manipulation, type conversion or initial value instruction in FIG. 1 is for illustrative purposes only. Those of ordinary skill in the art will recognize that the invention may be applied to many other instruction types or classifications as well.

Figure 12A:
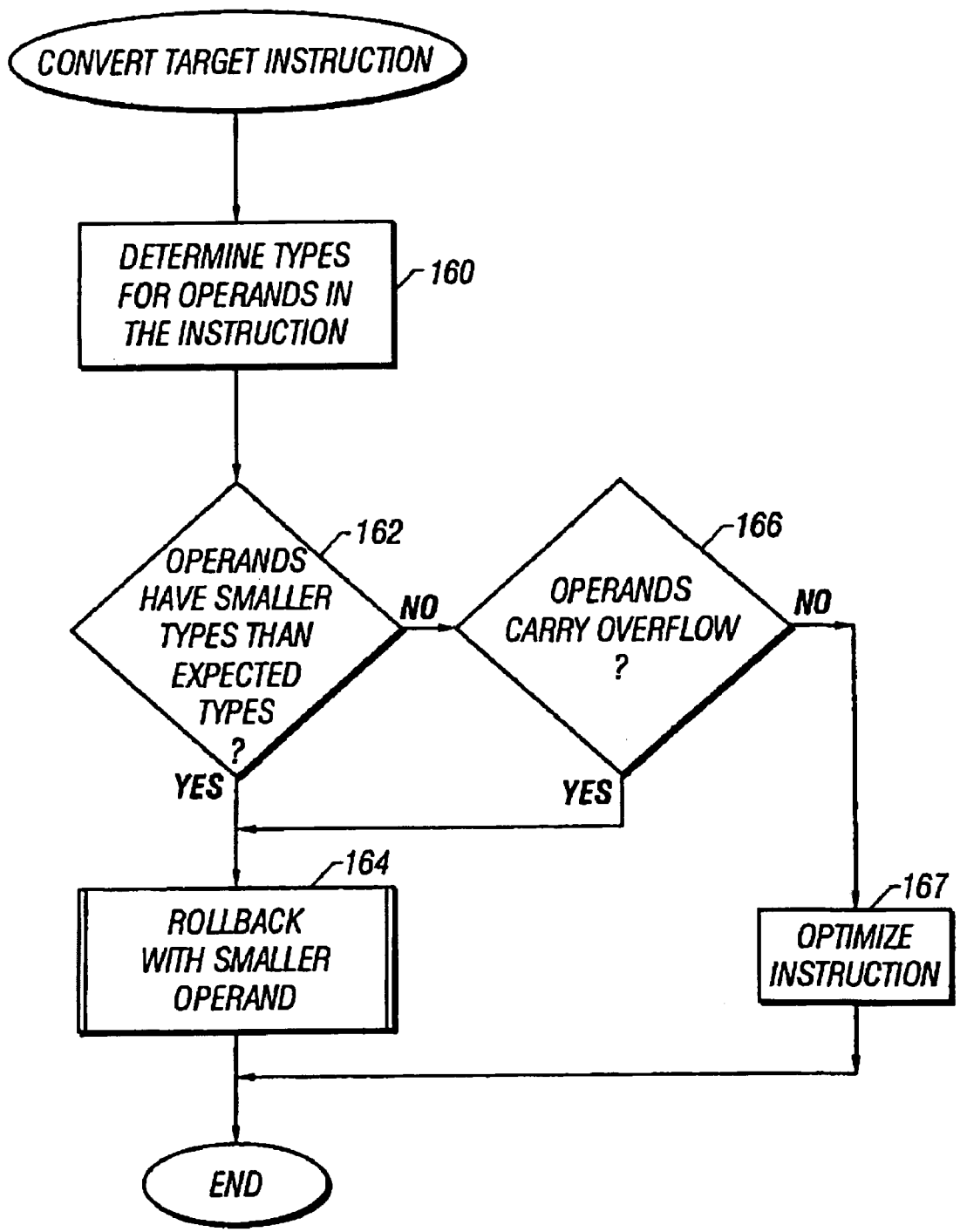
FIG. 12A is a flow diagram that illustrates a method for converting a target instruction in accordance with one embodiment of the present invention.

Turning now to FIG. 12A, a flow diagram that illustrates a method for converting a target instruction in accordance with one embodiment of the present instruction is presented. In the Java™ Virtual Machine instruction set, target instructions include branch, switch, array access, array creation and variable store/put instructions, as well as any other type-sensitive non-arithmetic instructions in a computer language that is not a stack manipulation, type conversion, initial value instruction or arithmetic expression.

At reference numeral 160, the desired types for instruction operands are determined. At reference numeral 162, a determination is made regarding whether the operands consumed by the target instruction have types that are smaller than the desired types of the target instruction. If the operands have types that are smaller than desired, the conversion process is rolled back with the smaller typed operand at reference numeral 164. If the operands do not have types that are smaller than desired, a determination regarding whether the operands carry potential overflow is made at reference numeral 166. An operand may carry potential overflow if it was created by one of the operators listed in Table 1, or if it is created by an operator that propagates overflow in an operand. Operators that propagate overflow include, by way of example, the "and", "or" and exclusive "or" (xor) operators. If none of the operands carries potential overflow, the instruction is optimized at reference numeral 167. If at least one of the operands potentially carries overflow, the conversion process is rolled back with the smaller operand at reference numeral 164.

Figure 12B:
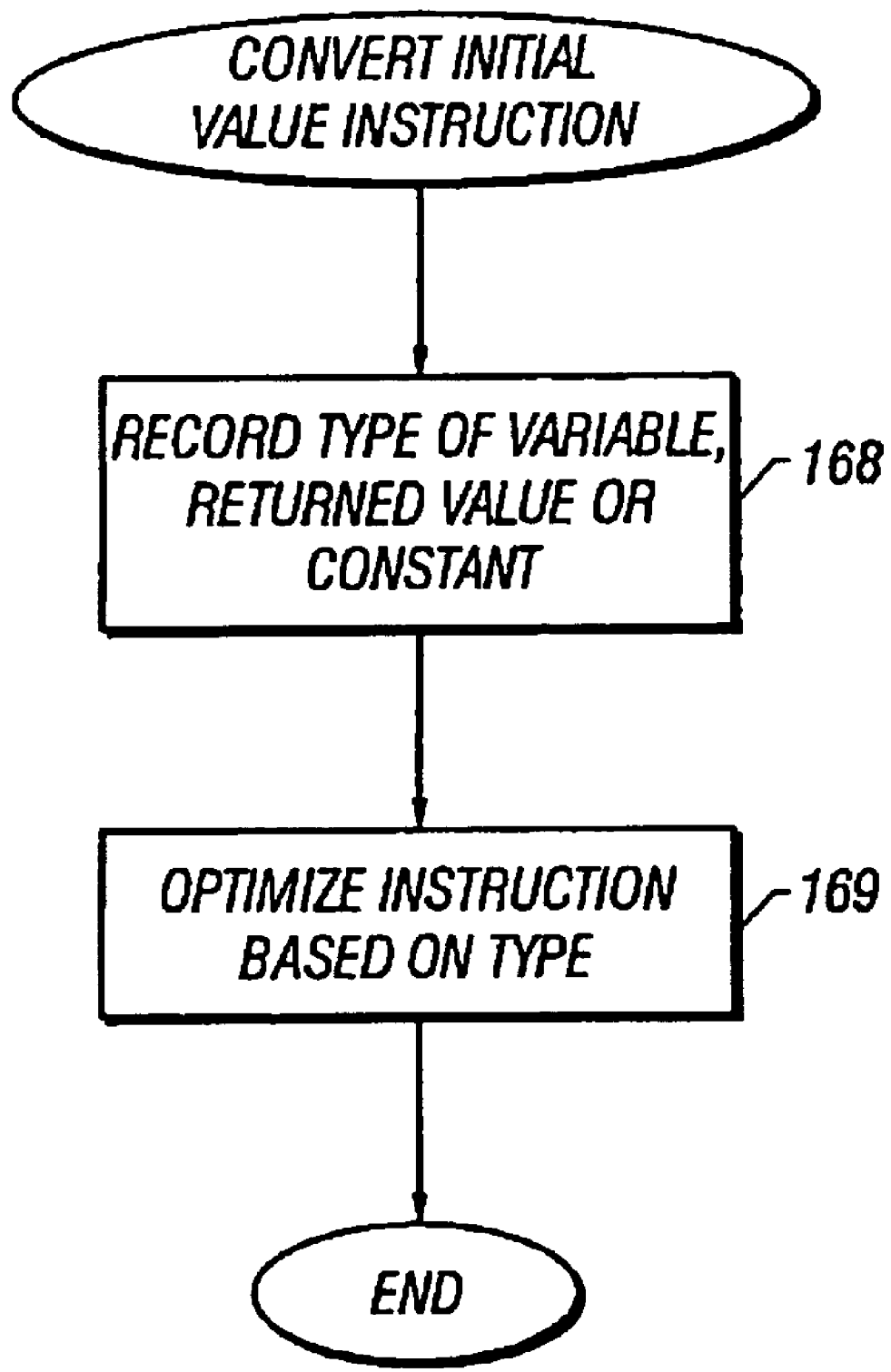
FIG. 12B is a flow diagram that illustrates a method for converting an initial value instruction in accordance with one embodiment of the present invention.

Turning now to FIG. 12B, a flow diagram that illustrates a method for converting an initial value instruction in accordance with one embodiment of the present invention is presented. Examples of initial value instructions include get/load instructions and other instructions that load a variable. Initial value instructions also include method invocation instructions, which return the method result. Additionally, initial value instructions include load constant instructions. These instructions are called "initial value" instructions because the values produced by the instructions are not the result of an intermediate computation. At reference numeral 168, the type of a variable, returned value or constant is received. At reference numeral 169, the initial value instruction is optimized according to the type of the variable or constant. For example, to load a short typed local variable, the iload instruction is optimized to sload.

Figure 13:
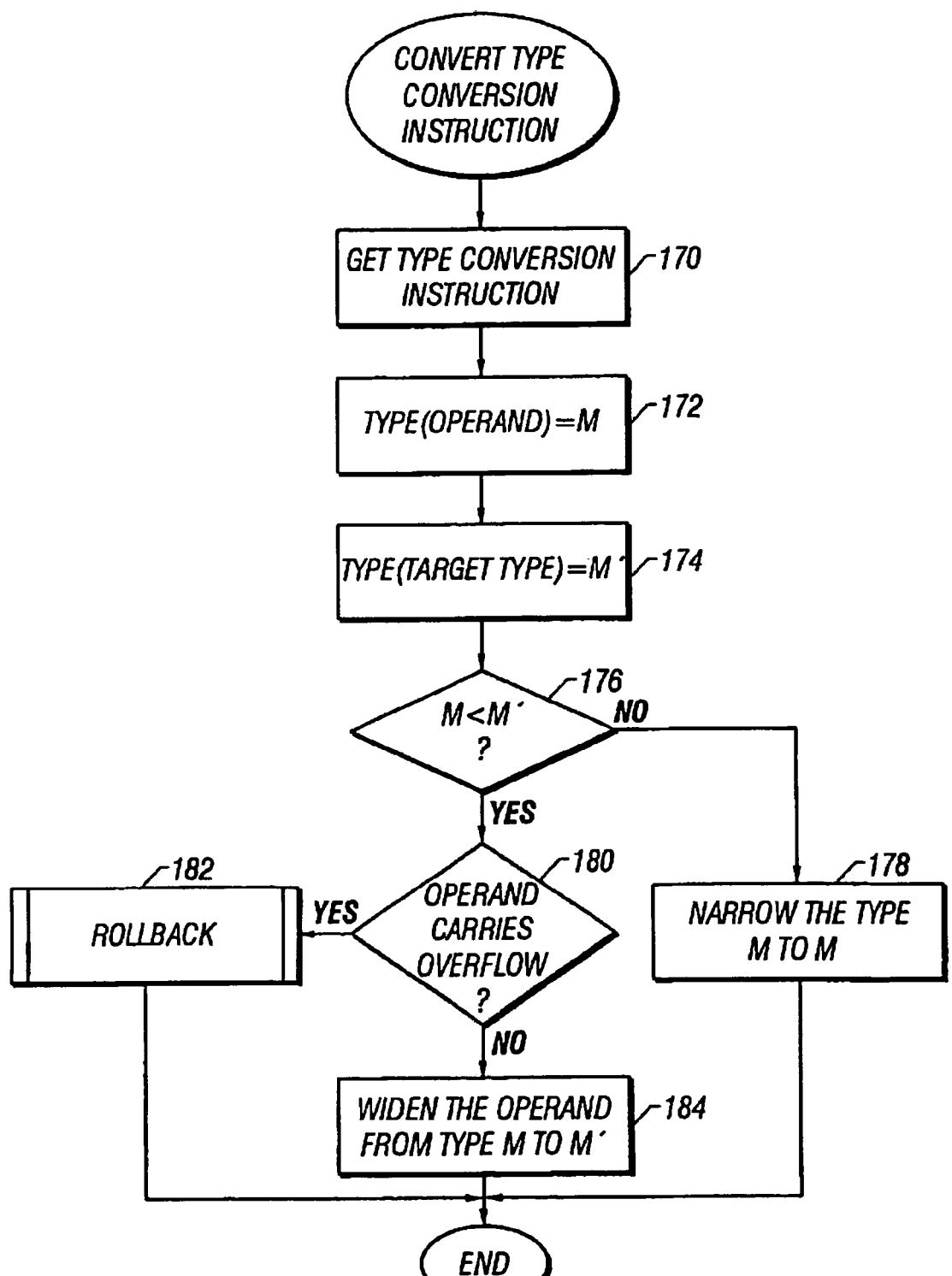
FIG. 13 is a flow diagram that illustrates a method for converting a type conversion instruction in accordance with one embodiment of the present invention.

Turning now to FIG. 13, a flow diagram that illustrates a method for converting a type conversion instruction in accordance with one embodiment of the present instruction is presented. A type conversion instruction may convert an operand to a larger type or a smaller type. For example, casting a 32-bit int type to a 16-bit short type converts the operand to smaller type. Likewise, casting an 8-bit byte type to a 32-bit int type converts the operand to a larger type. In the latter case, the byte type is called the operand type, and the int type is called the target type.

At reference numeral 170, an instruction is received. The operand type and the target type are determined at reference numerals 172 and 174, respectively. If the operand type is larger than the target type, the operand type is narrowed to the target type at reference numeral 178. If the operand type is smaller than the target type, a determination is made regarding whether the operand potentially carries overflow at reference numeral 180. If the operand potentially carries overflow, the conversion process is rolled back to correct the type at reference numeral 182. If the operand does not carry potential overflow, the operand is widened to the target type at reference numeral 184.

Figure 14:
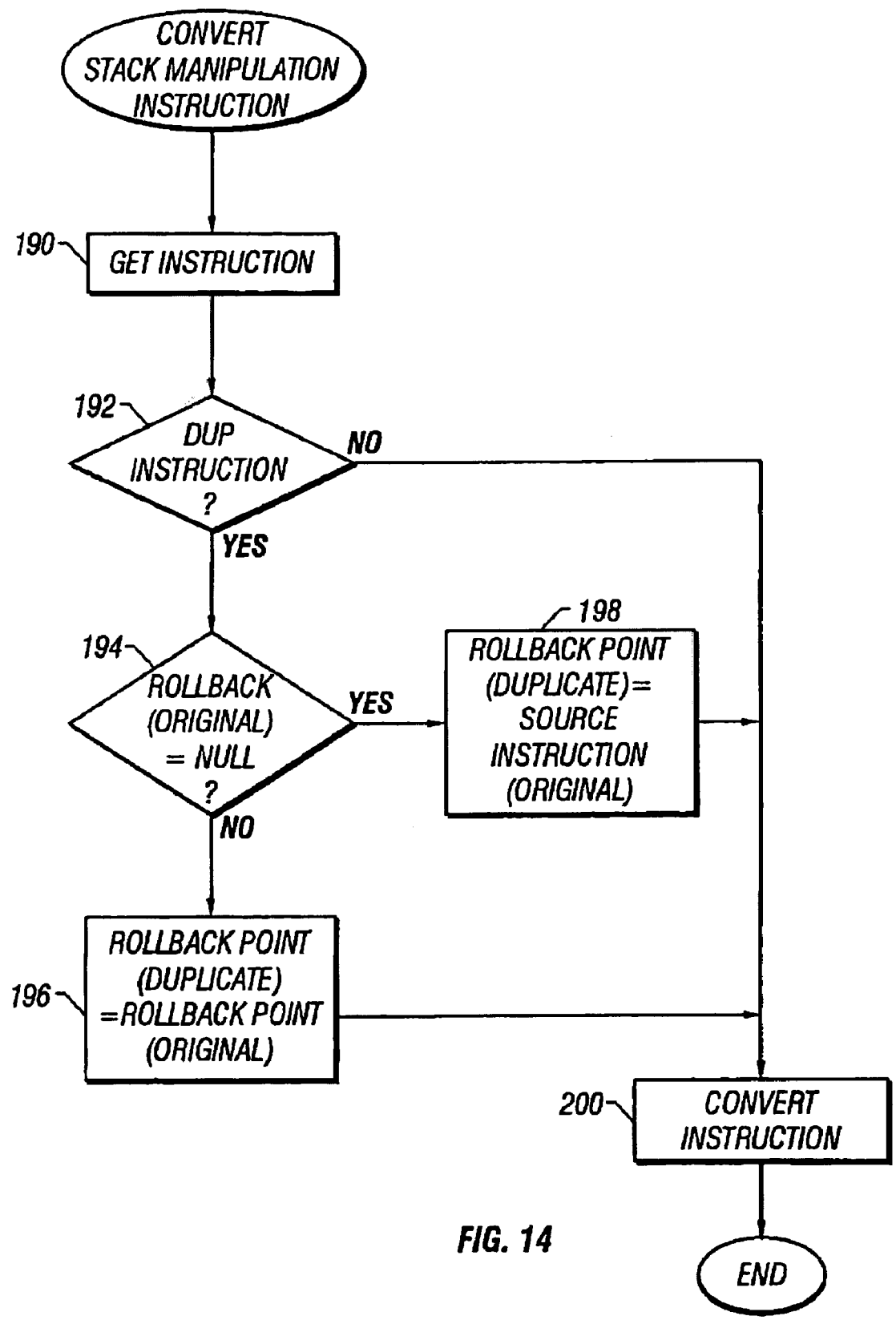
FIG. 14 is a flow diagram that illustrates a method for converting a stack manipulation instruction in accordance with one embodiment of the present invention.

Turning now to FIG. 14, a flow diagram that illustrates a method-for converting a stack manipulation instruction in accordance with one embodiment of the present instruction is presented. In the Java™ Virtual Machine instruction set, stack manipulation instructions include the "dup", "swap" and "pop" instructions. At reference numeral 190, an instruction is received. At reference numeral 192, a determination is made regarding whether the instruction is a dup instruction. If the instruction is a dup instruction, a determination regarding whether a rollback point for the original stack entry exists is made at reference numeral 194. If the original stack entry does not have a rollback point, the rollback point for the duplicated stack entry is set to the rollback point for the original stack entry at reference numeral 196. If the original stack entry has a rollback point, the rollback point for the duplicated stack entry is set to the source instruction of the original stack entry at reference numeral 198. At reference numeral 200, the instruction is converted.

Figure 15:
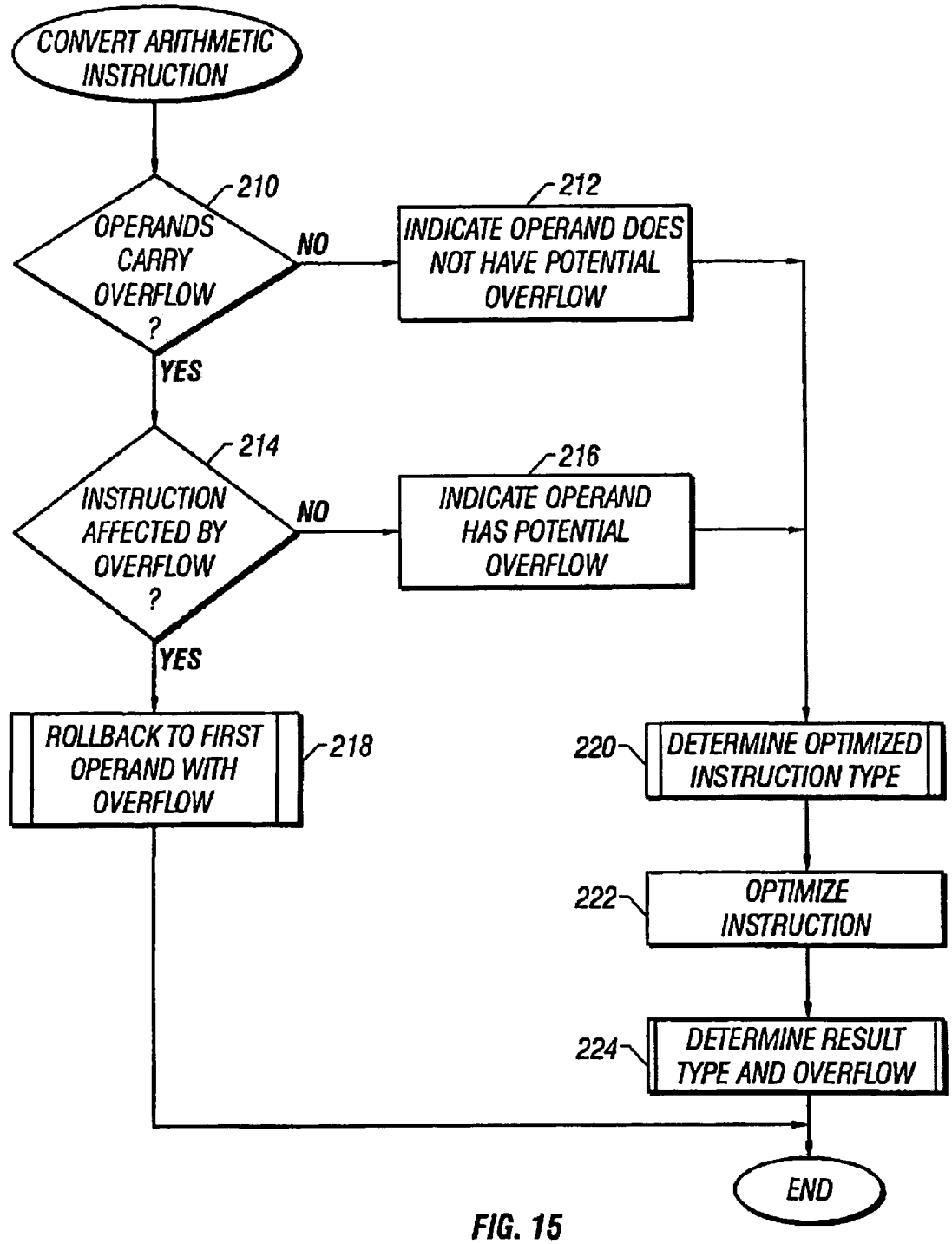
FIG. 15 is a flow diagram that illustrates a method for converting an arithmetic expression in accordance with one embodiment of the present invention

Turning now to FIG. 15, a flow diagram that illustrates a method for converting an arithmetic expression in accordance with one embodiment of the present invention is presented. At reference numeral 210, a determination is made regarding whether the operands carry potential overflow. If the operands do not carry potential overflow, an indication that the operands do not have potential overflow is made at reference numeral 212. If the operands carry potential overflow, a determination regarding whether the instruction is affected by overflow is made at reference numeral 214. If the instruction is not affected by overflow, an indication that the operand has potential overflow is made at reference numeral 216. If the instruction is affected by overflow, the conversion is rolled back at reference numeral 218 to the first operand with overflow. If the conversion is not rolled back, the optimized instruction type is determined at reference numeral 220, the instruction is optimized at reference numeral 222 and the result type and result overflow are determined at reference numeral 224.

Figure 16:
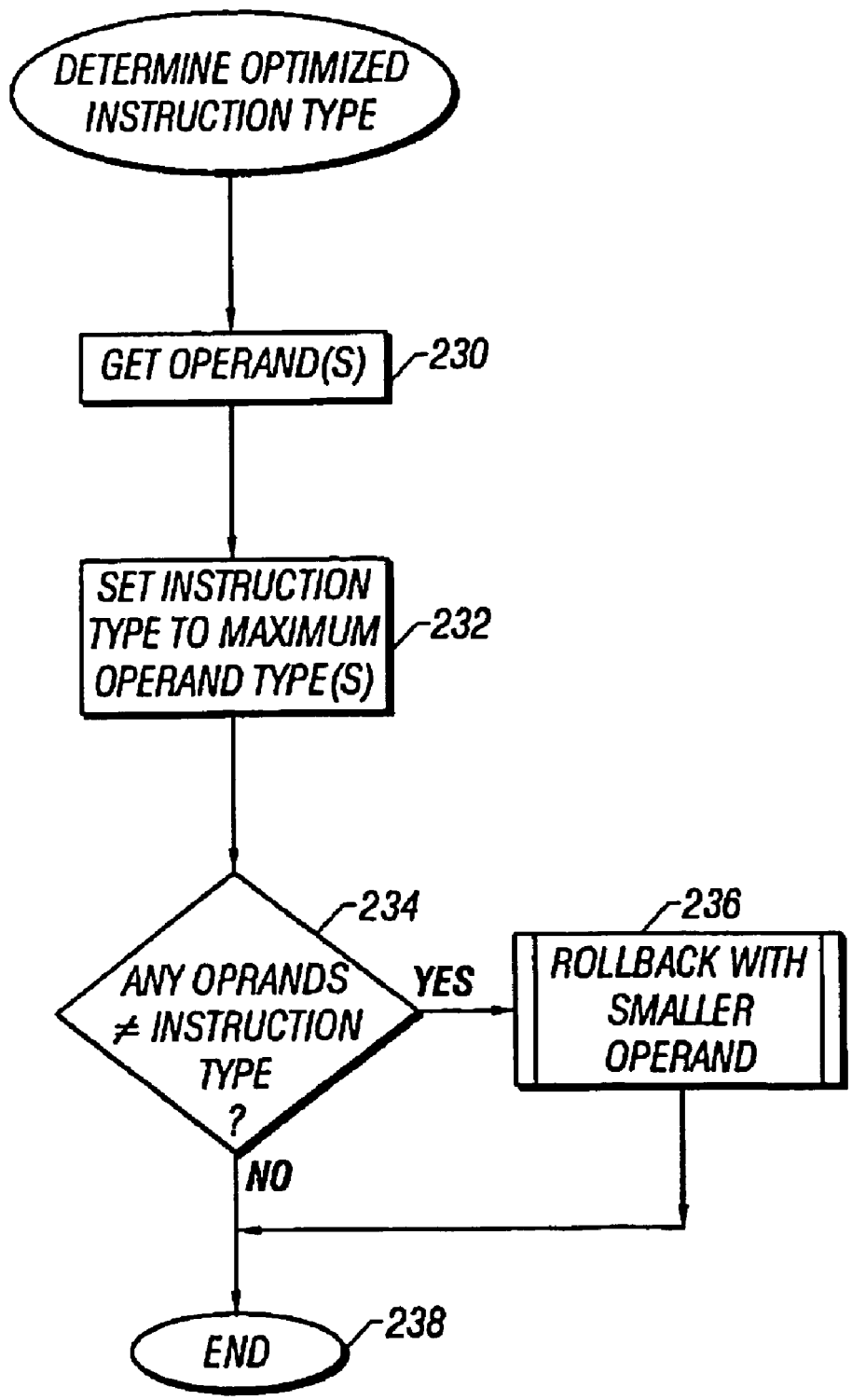
FIG. 16 is a flow diagram that illustrates a method for determining an optimized instruction type in accordance with one embodiment of the present invention.

Turning now to FIG. 16, a flow diagram that illustrates a method for determining an optimized instruction type in accordance with one embodiment of the present invention is presented. At reference numeral 230, at least one operand is received. At reference numeral 232, the desired instruction type is set to the largest type associated with the operand(s). At reference numeral 234, a determination is made regarding whether any of the operands have types smaller than the desired instruction type. If at least one operand has a type smaller than the desired type, the smaller operand is rolled back to correct the type at reference numeral 236.

Figure 17:
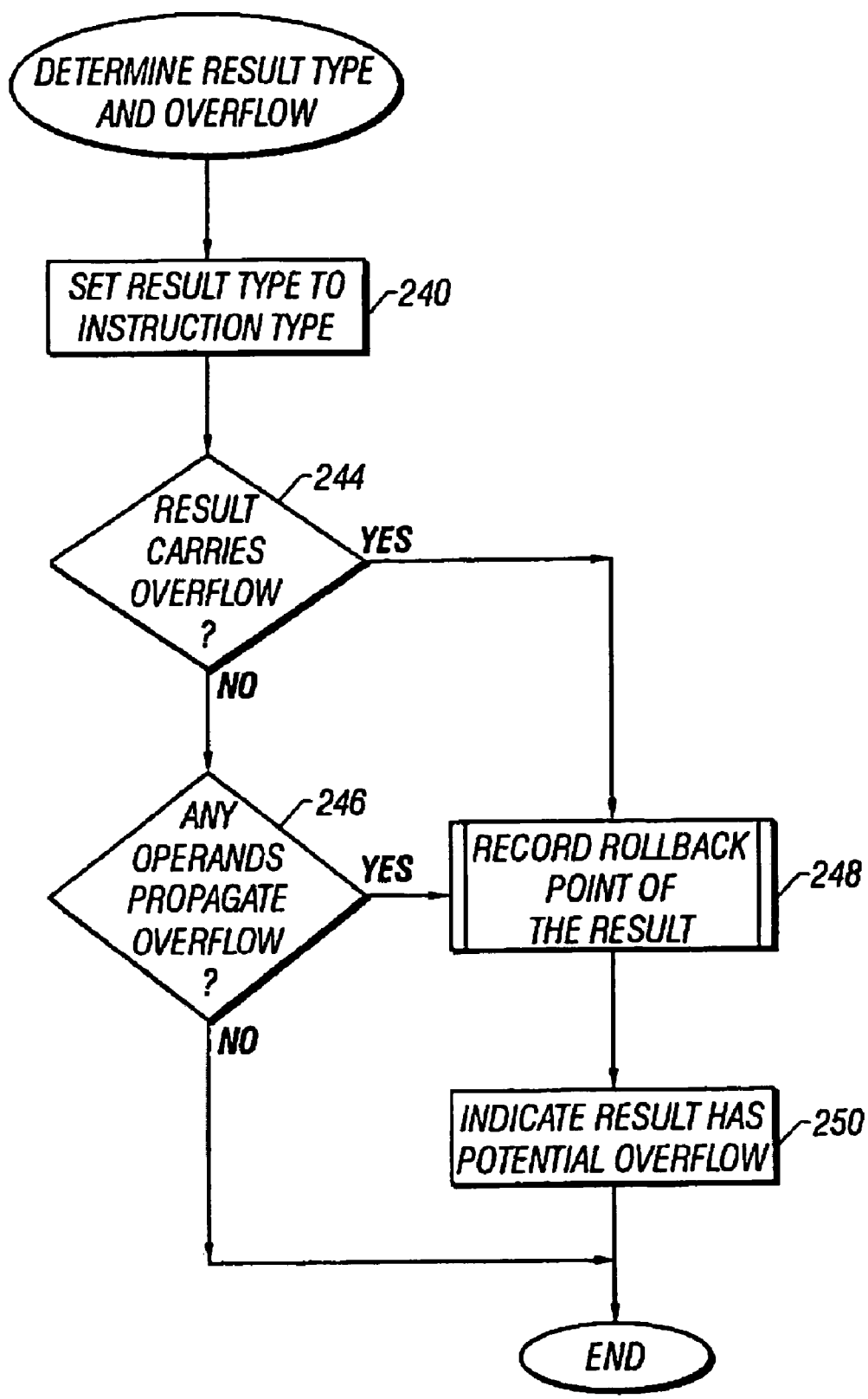
FIG. 17 is a flow diagram that illustrates a method for determining a result type and result overflow in accordance with one embodiment of the present invention.

Turning now to FIG. 17, a flow diagram that illustrates a method for determining a result type and result overflow in accordance with one embodiment of the present invention is presented. At reference numeral 240, the result type is set to the instruction type. The Java Card™ result types and overflow indications returned are summarized in tables 3 to 10, below. The tables are organized according to the type of instruction. Each table indicates the result type and the overflow indication based upon the types of one or two operands.

TABLE 3

Addition, Multiplication, Subtraction

| type(A) | and/or | type(B) | Result Type | Overflow |
|---|---|---|---|---|
| byte | and | byte | short | false |
| int | or | int | int | false |
| others | | | short | true |

TABLE 4

Division

| type(A) | and/or | type(B) | Result Type | Overflow |
|---|---|---|---|---|
| byte | and | byte | short | false |
| byte | and | short | short | false |
| int | or | int | int | false |
| others | | | short | true |

TABLE 5

Left Shift

| type(A) | Result Type | Overflow |
|---|---|---|
| byte | short | true |
| short | short | true |
| int | int | false |

TABLE 6

Right Shift

| type(A) | Result Type | Overflow |
|---|---|---|
| byte | byte | false |
| short | short | false |
| int | int | false |

TABLE 7

Negate

| type(A) | Result Type | Overflow |
|---|---|---|
| byte | short | false |
| short | short | true |
| int | int | false |

TABLE 8

Unsigned Right Shift

| type(A) | Result Type | Overflow |
|---|---|---|
| byte | short | true |
| short | short | true |
| int | int | false |

TABLE 9

| | | | | Remainder |
|---|---|---|---|---|
| type(A) | and/or | type(B) | Result Type | Overflow |
| int | or | int | int | false |
| others | | | short | false |

TABLE 10

| | | | | and, or, xor |
|---|---|---|---|---|
| type(A) | and/or | type(B) | Result Type | Overflow |
| byte | and | byte | byte | false |
| int | or | int | int | false |
| others | | | short | = overflow(operands) |

The use of Java Card™ result types and overflow indications in FIG. 17 are for illustrative purposes only. Those of ordinary skill in the art will recognize that the invention is applicable for other high order languages having other types.

At reference numeral 244, a determination is made regarding whether the result potentially carries overflow caused by using a more optimized instruction. If the result does not carry potential overflow, a determination is made regarding whether any operands propagate overflow at reference numeral 246. If at least one operand propagates overflow or if the result potentially carries overflow, the rollback point of the result is recorded at reference numeral 248 and an indication that the result has potential overflow is made at reference numeral 250.

Figure 18:
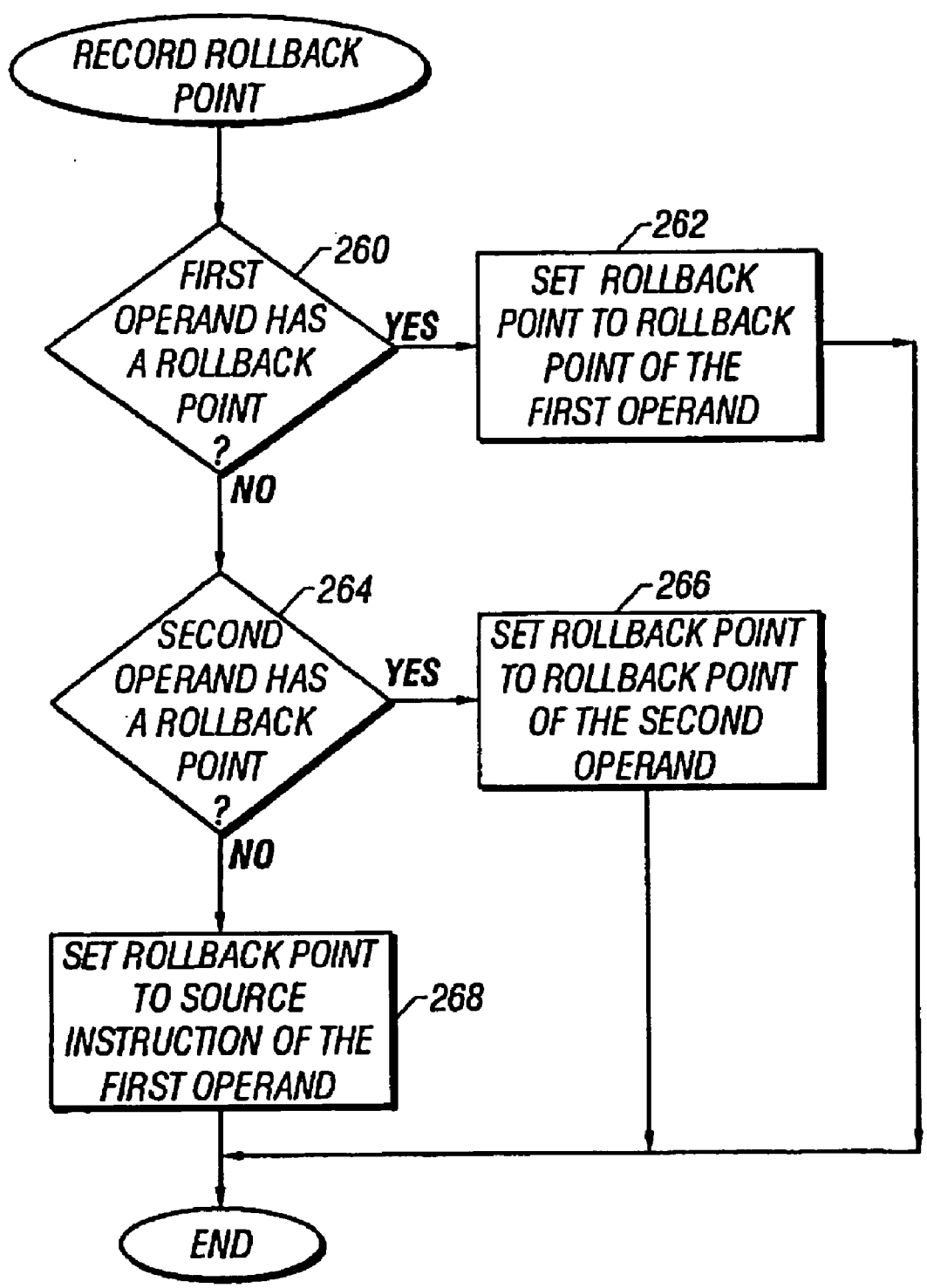
FIG. 18 is a flow diagram that illustrates a method for recording a rollback point in accordance with one embodiment of the present invention.

Turning now to FIG. 18, a flow diagram that illustrates a method for recording a rollback point in accordance with one embodiment of the present invention is presented. At reference numeral 260, a determination is made regarding whether a first operand has a rollback point associated with it. If the first operand has a rollback point associated with it, the rollback point for the current instruction is set to the rollback point of the first operand at reference numeral 262. If the first operand does not have overflow associated with it, a determination regarding whether a second operand has overflow associated with it is made at reference numeral 264. If the second operand has a rollback point associated with it, the rollback point of the instruction is set to the rollback point of the second operand at reference numeral 266. If neither operand has a rollback point associated with it, the rollback point of the instruction is set to the source instruction for the first operand at reference numeral 268.

According to a specific embodiment of the present invention, as shown in FIG. 18, "first operand" refers to the one created first. Setting the rollback point to the source instruction for the older operand may obviate the need to perform an additional rollback operation for the newer operand, since correcting the types associated with the older operand may correct types used subsequently by the newer operand.

Figure 19:
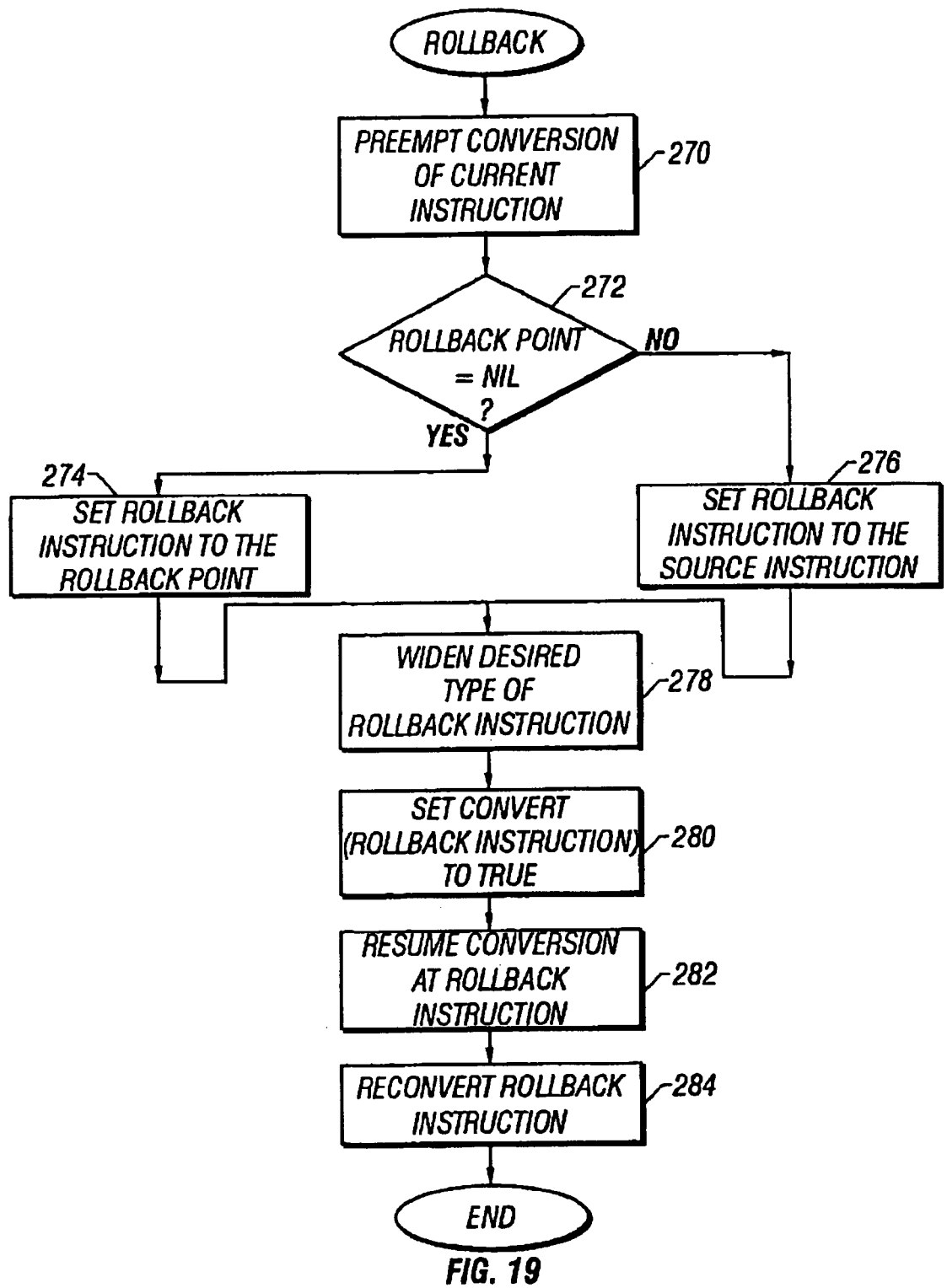
FIG. 19 is a flow diagram that illustrates a method for rolling back the conversion process in accordance with one embodiment of the present invention.

Turning, now to FIG. 19, a flow diagram that illustrates a method for rolling back the conversion process in accordance with one embodiment of the present invention is presented. At reference numeral 270, conversion of the current instruction is preempted. At reference numeral 272, a determination regarding whether the operand has a rollback point. If the operand does not have a rollback point, the rollback instruction is set to the source instruction that created the operand at reference numeral 276. If the operand has a rollback point, the rollback instruction is set to the same rollback point at reference numeral 274. At reference numeral 278, the desired type of the rollback instruction is widened. At reference numeral 280, an indication that the rollback instruction should be converted is made. At reference numeral 282, the conversion process resumes at the rollback instruction. At reference numeral 284, the rollback instruction is converted according to the new desired type.

Figure 20:
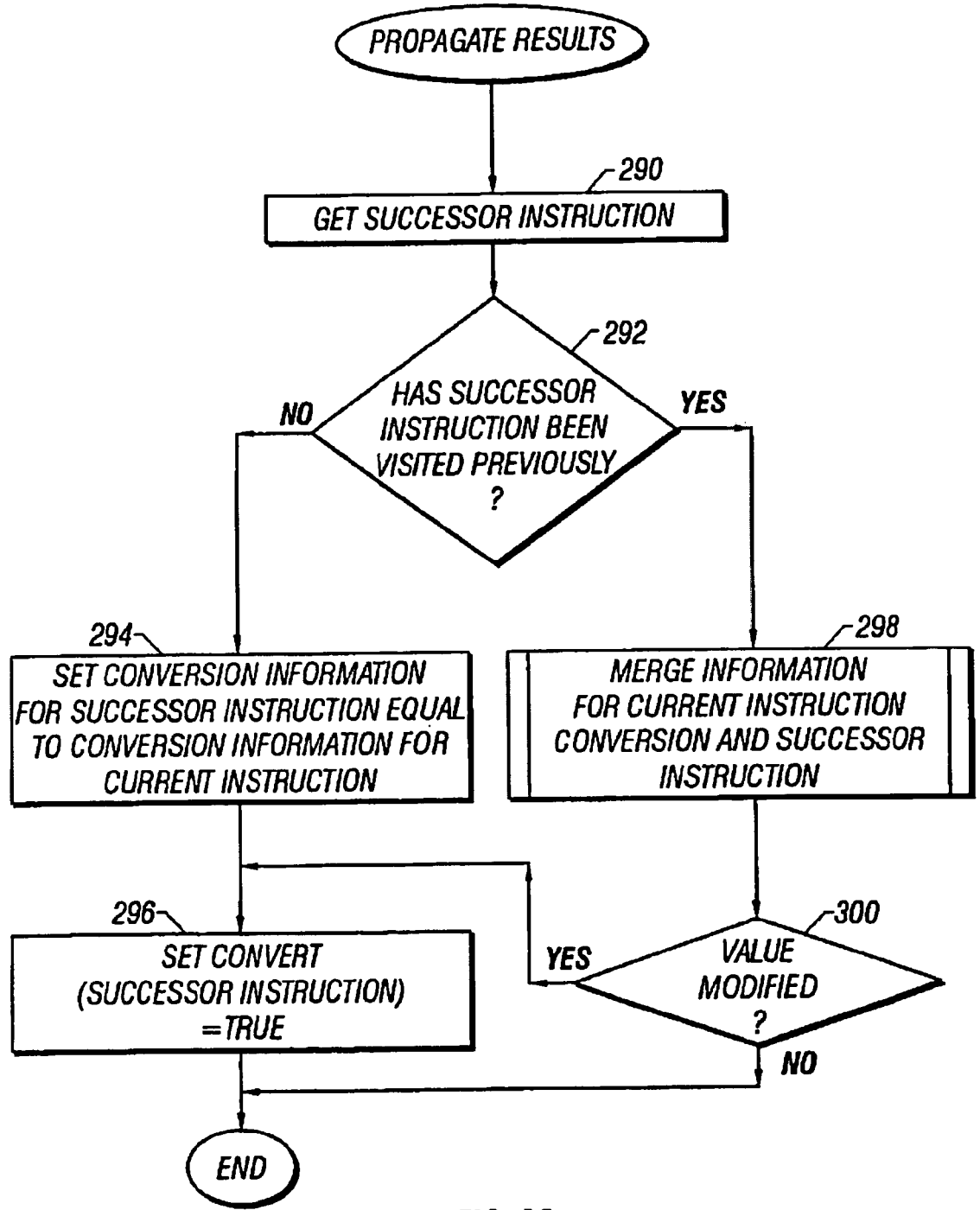
FIG. 20 is a flow diagram that illustrates propagating the results of an instruction optimization in accordance with one embodiment of the present invention.

Turning now to FIG. 20, a flow diagram that illustrates propagating the results of an instruction optimization in accordance with one embodiment of the present invention is presented. At reference numeral 290, a successor instruction is obtained. A successor instruction is an instruction in the same control path as the current instruction, and occurring immediately after the current instruction. Those of ordinary skill in the art will recognize that a single instruction may be part of many control paths.

At reference numeral 292, a determination is made regarding whether the successor instruction has been visited previously in the conversion process. If the successor instruction has not been visited previously, the conversion information for the successor instruction is set equal to the conversion information for the current instruction at reference numeral 294 and an indication that the successor instruction should be converted is made at reference numeral 296. The conversion information may include the runtime state at the current conversion point. For example, the values created by the current or previous instruction that have not been consumed. The values will be used as operands to successor instructions in the control path. For each value, the type, source instruction and rollback point are recorded. If the successor instruction has been visited previously, the conversion information previously recorded at the successor instruction is merged with the current conversion information at reference numeral 298. At reference numeral 298, a determination regarding whether a value within the merged information has been modified is made at reference numeral 300. If a value has been modified, an indication that the successor instruction should be converted is made at reference numeral 296. This process is repeated for each successor instruction.

Figure 21:
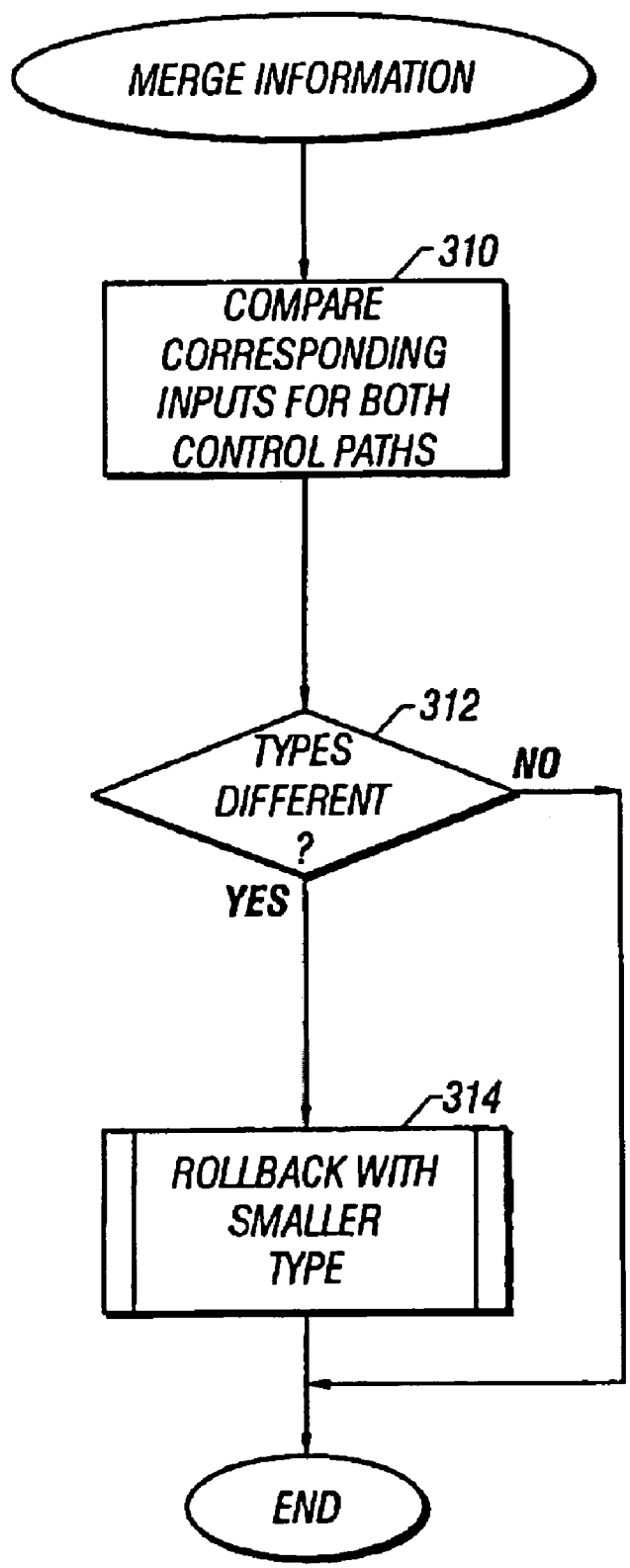
FIG. 21 is a flow diagram that illustrates merging conversion information from different control paths in accordance with one embodiment of the present invention.

Turning now to FIG. 21, a flow diagram that illustrates merging conversion information from different control paths in accordance with one embodiment of the present invention is presented. At reference numeral 310, the corresponding inputs for both control paths are compared. At reference numeral 312, a determination is made regarding whether the types for corresponding inputs are different. If the types are different, the input having the smaller type is rolled back at reference numeral 314. This process is repeated for each operand.

Figure 22A:
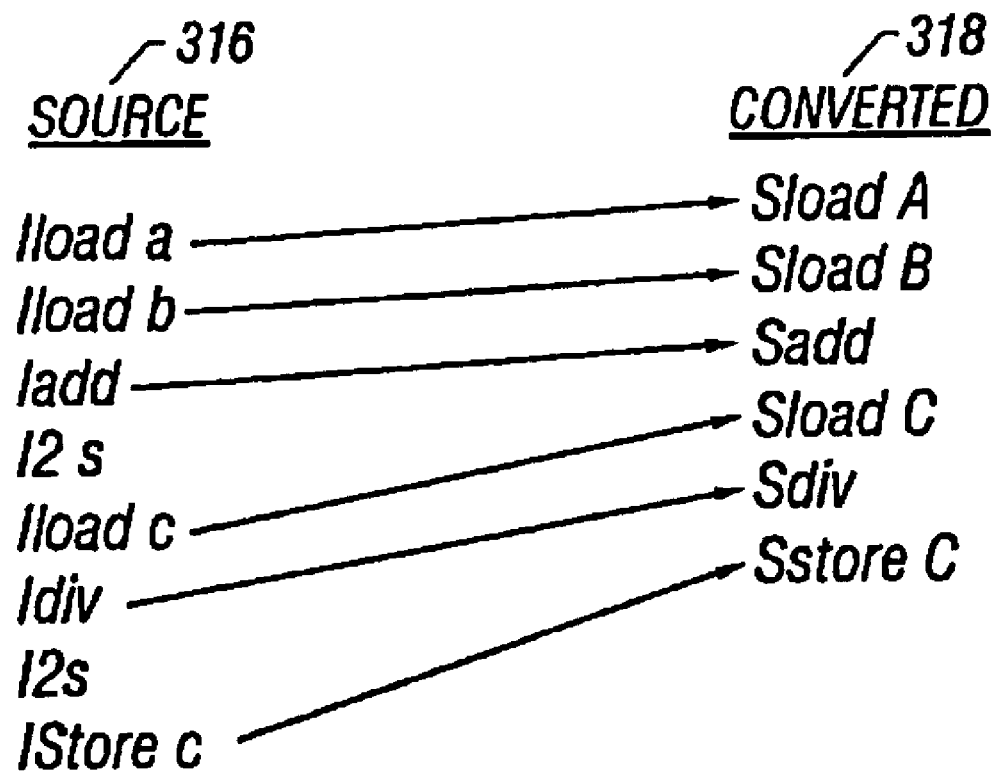
FIG. 22A is a block diagram that illustrates instruction conversion in accordance with one embodiment of the present invention.

Turning now to FIG. 22A, a block diagram illustrating instruction conversion in accordance with one embodiment of the present invention is presented. This demonstrates applying the present invention to an arithmetic expression that can be optimized. FIG. 22A illustrates the conversion process for the Java™ expression short c=(short)((short)(a+b)/c)

where the values a, b and c are of type short. The Java™ bytecode sequence for this expression is shown at reference numeral 316.

Instruction conversion begins with the iload_a instruction. Instructions associated with the first, smaller type are used for the load and add instructions. As specified in Table 1, the add instruction creates potential overflow, but the explicit cast to type short at the source level removes the possibility of overflow. The div 330 instruction is affected by overflow as indicated in Table 2. However, no potential overflow is present because of the explicit cast. Therefore, the need to "roll back" to the addition operation to create a larger type does not occur.

To further aid in an understanding of the present invention, the example discussed above will be described in more detail, with reference to FIGS. 10 to 21.

The iload instruction is a source instruction. At reference numeral 160, the desired type for the "a" operand is type short. At reference numeral 162, the operand "a" is type short. At reference numeral 166, the operands do not carry potential overflow because they were loaded directly and thus were not created by an operation that creates overflow. Therefore, a short-flavored instruction is used to convert the iload instruction to an sload_a instruction at reference numeral 167. Similarly, the iload_b instruction is converted to an sload_b instruction.

Next, the iadd instruction is processed. Since iadd is an instruction that may create overflow, a check is made to determine whether its operands carry potential overflow at reference numeral 210. Both operands were loaded directly so they do not carry potential overflow. Hence, the optimized result type is determined at reference numeral 220. At reference numeral 232, the instruction type is set to the maximum operand type. In this example, the maximum operand type is type short because both operand "a" and operand "b" are of type short. Since both operands are the same type as the instruction type, type short is returned as the instruction type at reference numeral 238.

Next, the instruction is optimized at reference numeral 222. Since the instruction type is type short, the optimized instruction is "sadd". Next, the result type and overflow indication is determined at reference numeral 224. At reference numeral 240, the result type is set to type short, which is the instruction type. Additionally, an indication that the result has potential overflow is made, according to Table 3. Since the result contains potential overflow, the rollback point for the result of (a+b) is recorded at reference numeral 248. Neither operand has a rollback point, so the rollback point for the result is set to the source instruction for operand "a" (the first operand) at reference numeral 268. At reference numeral 250, an indication that the result has potential overflow is made.

Next, the i2s instruction is processed. The i2s instruction is a type conversion instruction. At reference numeral 176, the operand type (short) is compared to the target type (short). Since both types are the same, the type is narrowed to type short at reference numeral 178, eliminating potential overflow.

Next, the iload_c instruction is processed. Like values a and b, c is of type short and the iload_c instruction is converted to an sload_c instruction. Next, the idiv instruction is processed. As specified in Table 2, idiv is an instruction that may be affected by overflow. The "a+b" operand does not carry potential overflow due to the explicit source-level cast to short, so the optimized divide instruction type is determined to be type short at reference numeral 232 and the result type is set to type short at reference numeral 240.

Next, the i2s instruction is processed. At reference numeral 176, the operand type (short) is compared to the target type (short). Since both types are the same, the type is narrowed to type short at reference numeral 178, eliminating potential overflow.

Finally, the istore_c instruction is processed. Since the desired type is type short and the operands do not carry overflow, the istore_c instruction is optimized to a sstore_c instruction at reference numeral 167. The converted bytecodes are shown at reference numeral 318.

Turning now to FIG. 22B, a block diagram illustrating instruction conversion in accordance with one embodiment of the present invention is presented. This demonstrates applying the present invention to an arithmetic expression that cannot be optimized. Nevertheless, the converted code maintains semantic equivalence with the unconverted code. FIG. 22B illustrates the conversion process for the Java™ expression short $c=(short)((a+b)/c)$ where the values a, b and c are of type short. The Java™ bytecode sequence for this expression is shown at reference numeral 320.

Instruction conversion begins with the iload_a instruction, represented at reference numeral 322. Instructions associated with the first, smaller type are used for the load 322, 324 and add 326 instructions. As specified in Table 1, the add instruction 326 creates the potential for overflow, but does not require using the second, larger type. The div 330 instruction, however, is affected by overflow. This is indicated in Table 2. Thus, the instructions creating the overflow problem must be corrected. The problem is corrected by "rolling back" to reference numeral 322 and using the second, large-typed instructions for operand "a".

At reference numeral 332, instruction conversion proceeds a second time until it is determined that operand "b" must also be converted to a larger type, requiring rolling back a second time. Instruction conversion then proceeds a third time at reference numeral 334 until it is determined that the instructions for operand "c" need to use the larger type. Rollback is performed a third time, the type for operand "c" is corrected and the conversion process completes after continuing the conversion process a fourth time at reference numeral 336.

To further aid in an understanding of the present invention, the example of FIG. 22B discussed above will be described in more detail, with reference to FIGS. 10 to 21.

The initial conversion of the iload_a, iload_b and iadd instructions proceeds as described in the previous example. Next, the iload_c instruction is converted to an sload_c instruction at reference numeral 167. Next, the idiv instruction is processed. As specified in Table 2, idiv is an instruction that may be affected by overflow. The "a+b" operand the potential for overflow because it was created by the "+" operator and that operator may create overflow as indicated in Table 1. Since at least one operand the potential for overflow, a rollback to the first operand with overflow is performed at reference numeral 218.

At reference numeral 270, conversion of the current instruction is preempted. At reference numeral 274, overflow is associated with the a+b operand, so the rollback point is set to the rollback point for the a+b operand. At reference numeral 278, the desired type of rollback instruction is widened from type short to type int. At reference numeral 280, an indication to convert the instruction being rolled back to is made. At reference numeral 282, the conversion process is resumed at the iload_a instruction, which was previously converted to an sload_a instruction. At reference numeral 284, the iload_a instruction is converted.

As a result of the rollback, the iload_a instruction is processed at reference numeral 338. At reference numeral 124, the result type and the desired type are matched. Since the result type is short and the desired type is int, the types do not match, Thus, the S2I instruction is created to promote the short to an int. Processing continues with the iload_b instruction and the iadd instruction. At reference numeral 210, the operands for the iadd instruction do not carry potential overflow, so the optimized result type is determined at reference numeral 220. At reference numeral 234, the operand types are compared. Since the "a" operand is now type int and the "b" operand is still type short, rollback is performed for the "b" operand. At reference numeral 276, the rollback instruction is set to the iload_b instruction 340. At reference numeral 278, the desired type is set to int. At reference numeral 280, an indication to convert the current instruction is made. At reference numerals 282 and 284, the conversion is resumed at the iload_b instruction and the instruction is converted.

At reference numeral 124, the result type and the desired type are matched. Since the result type is short and the desired type is int, the types do not match, Thus, the S2I instruction is created to promote the short to an int.

Next, the iadd instruction is processed. After rolling back twice, neither operand has the potential for overflow. Therefore, an indication that the operand does not carry potential overflow is made at reference numeral 210 and the optimized instruction type is determined at reference numeral 220. At reference numeral 232, the instruction type is set to the maximum operand type. Since the a+b operand is type int and the "c" operand is type short, the instruction type is set to int. Since the "c" operand type is different than the instruction type, rollback is performed on the "c" operand at reference numeral 236. At reference numeral 276, the rollback instruction is set to the iload_c instruction. At reference numeral 278, the desired type of rollback instruction is widened from type short to type int. The conversion process resumes at the iload_c instruction 342.

At reference numeral 124, the result type and the desired type are matched. Since the result type is short and the desired type is int, the types do not match, Thus, the S2I instruction is created to promote the short to an int.

Next, the idiv instruction is processed. At reference numeral 238, the optimized instruction type is set to int, since both operands are of type int. At reference numeral 222, an int-flavored instruction (idiv) is selected. The final instruction sequence is represented at reference numeral 344 of FIG. 22.

Although the present invention has been described with regard to integral types, those of ordinary skill in the art will recognize that the present invention may be applied to floating-point arithmetic expressions as well. Furthermore, although the present invention has been illustrated with respect to Java Card™ technology, those of ordinary skill in the art will recognize that the invention is applicable to many other platforms. These platforms include, by way of example, K virtual machine (KVM) technology. KVM technology is described in "The K Virtual Machine (KVM)—A White Paper", Jun. 8, 1999, Sun Microsystems, Inc.

The present invention may be implemented in software or firmware. It may be implemented in other processors, as well as in programmable gate array devices, Application Specific Integrated Circuits (ASICs), and other hardware.

Thus, a novel method for adaptive optimization of arithmetic expressions has been described. Uniform-typed instructions are converted to semantically equivalent typed instructions for a second, smaller (having a smaller number of bits) integral type for execution on a resource-constrained machine, thus providing relatively efficient stack utilization and increased execution speed. While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for arithmetic expression optimization, comprising:
    receiving a first instruction defined for a first processor having a first base, said instruction including an operator and at least one operand; and
    converting said first instruction to a second instruction optimized for a second processor having a second base when said at least one operand does not carry potential overflow beyond said second base or when said operator is insensitive to overflow, said second base smaller than said first base.

2. The method of claim 1, further comprising, after said converting said first instruction, returning to receiving said first instruction until all instructions defined for said first processor are converted.

3. The method of claim 1, further comprising rejecting an expression that cannot be optimized to a smaller base on said second processor.

4. The method of claim 1 wherein said first instruction is arithmetic.

5. The method of claim 1 wherein said first instruction comprises a nonarithmetic, type-sensitive instruction.

6. The method of claim 1, further comprising linking each instruction to successor instructions in all control paths.

7. The method of claim 1 wherein said converting said first instruction further comprises:
    linking each result of an instruction to all instructions that consume said result;
    if said converting includes creating a value, linking said value to the instruction that produced said value; and
    if said value carries a potential for overflow, linking said value to the instruction that originally caused said overflow.

8. The method of claim 1 wherein
    said first processor comprises a Java™ Virtual Machine; and
    said second processor comprises a Java Card™ Virtual Machine.

9. The method of claim 1 wherein
    said first base is used by said first processor for performing arithmetic operations on at least one data type, said at least one data type having a size less than the size of said first base; and
    said second base is used by said second processor for performing arithmetic operations on said at least one data type, said second base having a size equal to the size of said at least one data type.

10. The method of claim 1 wherein
    said first base is used by said first processor for performing arithmetic operations on at least one data type, said at least one data type having a size less than the size of said first base; and
    said second base is used by said second processor for performing arithmetic operations on said at least one data type, said second base having a size greater than the size of said at least one data type.

11. A method for arithmetic expression optimization, comprising:
    receiving a first instruction defined for a first processor having a first base, said instruction including an operator and at least one operand; and
    converting to a wider base a third instruction that is a source of potential overflow associated with said at least one operand when said at least one operand carries the potential for overflow beyond a second base of a second processor and when said operator is sensitive to overflow, said third instruction having been previously optimized, said second base smaller than said first base, said wider base larger than said second base and smaller or equal to said first base.

12. The method of claim 11 wherein said converting to a wider base further comprises discarding previous conversion results of said third instruction before said converting to a wider base.

13. The method of claim 11, further comprising rejecting an expression that cannot be optimized to a smaller base on said second processor.

14. The method of claim 11 wherein said converting to a wider base further comprises rejecting said first instruction when said wider base is not supported by said second processor.

15. The method of claim 11 wherein said first instruction is arithmetic.

16. The method of claim 11 wherein said first instruction comprises a non-arithmetic, type-sensitive instruction.

17. The method of claim 11, further comprising linking each instruction to successor instructions in all control paths.

18. The method of claim 11 wherein
    said first processor comprises a Java™ Virtual Machine; and
    said second processor comprises a Java CardtM Virtual Machine.

19. The method of claim 11 wherein
    said first base is used by said first processor for performing arithmetic operations on at least one data type, said at least one data type having a size less than the size of said first base; and
    said second base is used by said second processor for performing arithmetic operations on said at least one data type, said second base having a size equal to the size of said at least one data type.

20. The method of claim 11 wherein
    said first base is used by said first processor for performing arithmetic operations on at least one data type, said at least one data type having a size less than the size of said first base; and
    said second base is used by said second processor for performing arithmetic operations on said at least one data type, said second base having a size greater than the size of said at least one data type.

21. A program storage device readable by a machine, embodying a program of instructions executable by the machine to perform a method for arithmetic expression optimization, the method comprising:
    receiving a first instruction defined for a first processor having a first base, said instruction including an operator and at least one operand; and
    converting said first instruction to a second instruction optimized for a second processor having a second base when said at least one operand does not carry potential overflow beyond said second base or when said operator is insensitive to overflow, said second base smaller than said first base.

22. The program storage device of claim 21, said method further comprising, after said converting said first instruction, returning to receiving said first instruction until all instructions defined for said first processor are converted.

23. The program storage device of claim 21, said method further comprising rejecting an expression that cannot be optimized to a smaller base on said second processor.

24. The program storage device of claim 21 wherein said first instruction is arithmetic.

25. The program storage device of claim 21 wherein said first instruction comprises a non-arithmetic, type-sensitive instruction.

26. The program storage device of claim 21, said method further comprising linking each instruction to successor instructions in all control paths.

27. The program storage device of claim 21 wherein said converting said first instruction further comprises:
    linking each result of an instruction to all instructions that consume said result;
    if said converting includes creating a value, linking said value to the instruction that produced said value; and
    if said value carries a potential for overflow, linking said value to the instruction that originally caused said overflow.

28. The program storage device of claim 21 wherein
    said first processor comprises a Java™ Virtual Machine; and
    said second processor comprises a Java Card™ Virtual Machine.

29. The program storage device of claim 21 wherein
    said first base is used by said first processor for performing arithmetic operations on at least one data type, said at least one data type having a size less than the size of said first base; and
    said second base is used by said second processor for performing arithmetic operations on said at least one data type, said second base having a size equal to the size of said at least one data type.

30. The program storage device of claim 21 wherein
    said first base is used by said first processor for performing arithmetic operations on at least one data type, said at least one data type having a size less than the size of said first base; and
    said second base is used by said second processor for performing arithmetic operations on said at least one data type, said second base having a size greater than the size of said at least one data type.

31. A program storage device readable by a machine, embodying a program of instructions executable by the machine to perform a method for arithmetic expression optimization, the method comprising:
    receiving a first instruction defined for a first processor having a first base, said instruction including an operator and at least one operand; and
    converting to a wider base a third instruction that is a source of potential overflow associated with said at least one operand when said at least one operand carries the potential for overflow beyond a second base of a second processor and when said operator is sensitive to overflow, said third instruction having been previously optimized, said second base smaller than said first base, said wider base larger than said second base and smaller or equal to said first base.

32. The program storage device of claim 31 wherein said converting to a wider base further comprises discarding previous conversion results of said third instruction before said converting to a wider base.

33. The program storage device of claim 31, said method further comprising rejecting an expression that cannot be optimized to a smaller base on said second processor.

34. The program storage device of claim 31 wherein said converting to a wider base further comprises rejecting said first instruction when said wider base is not supported by said second processor.

35. The program storage device of claim 31 wherein said first instruction is arithmetic.

36. The program storage device of claim 31 wherein said first instruction comprises a non-arithmetic, type-sensitive instruction.

37. The program storage device of claim 31, said method further comprising linking each instruction to successor instructions in all control paths.

38. The program storage device of claim 31 wherein
said first processor comprises a Java™ Virtual Machine; and
said second processor comprises a Java Card™ Virtual Machine.

39. The program storage device of claim 31 wherein
said first base is used by said first processor for performing arithmetic operations on at least one data type, said at least one data type having a size less than the size of said first base; and
said second base is used by said second processor for performing arithmetic operations on said at least one data type, said second base having a size equal to the size of said at least one data type.

40. The program storage device of claim 31 wherein
said first base is used by said first processor for performing arithmetic operations on at least one data type, said at least one data type having a size less than the size of said first base; and
said second base is used by said second processor for performing arithmetic operations on said at least one data type, said second base having a size greater than the size of said at least one data type.

41. An apparatus for arithmetic expression optimization, comprising:
means for receiving a first instruction defined for a first processor having a first base, said instruction including an operator and at least one operand; and
means for converting said first instruction to a second instruction optimized for a second processor having a second base when said at least one operand does not carry potential overflow beyond said second base or when said operator is insensitive to overflow, said second base smaller than said first base.

42. The apparatus of claim 41, further comprising means for, after said converting said first instruction, returning to receiving said first instruction until all instructions defined for said first processor are converted.

43. The apparatus of claim 41, further comprising means for rejecting an expression that cannot be optimized to a smaller base on said second processor.

44. The apparatus of claim 41 wherein said first instruction is arithmetic.

45. The apparatus of claim 41 wherein said first instruction comprises a non-arithmetic, type-sensitive instruction.

46. The apparatus of claim 41, further comprising means for linking each instruction to successor instructions in all control paths.

47. The apparatus of claim 41 wherein said means for converting said first instruction further comprises:
means for linking each result of an instruction to all instructions that consume said result;
means for, if said converting includes creating a value, linking said value to the instruction that produced said value; and
means for, if said value carries a potential for overflow, linking said value to the instruction that originally caused said overflow.

48. The apparatus of claim 41 wherein
said first processor comprises a Java™ Virtual Machine; and
said second processor comprises a Java Card™ Virtual Machine.

49. The apparatus of claim 41 wherein
said first base is used by said first processor for performing arithmetic operations on at least one data type, said at least one data type having a size less than the size of said first base; and
said second base is used by said second processor for performing arithmetic operations on said at least one data type, said second base having a size equal to the size of said at least one data type.

50. The apparatus of claim 41 wherein
said first base is used by said first processor for performing arithmetic operations on at least one data type, said at least one data type having a size less than the size of said first base; and
said second base is used by said second processor for performing arithmetic operations on said at least one data type, said second base having a size greater than the size of said at least one data type.

51. An apparatus for arithmetic expression optimization, comprising:
means for receiving a first instruction defined for a first processor having a first base, said instruction including an operator and at least one operand; and
means for converting to a wider base a third instruction that is a source of potential overflow associated with said at least one operand when said at least one operand carries the potential for overflow beyond a second base of a second processor and when said operator is sensitive to overflow, said third instruction having been previously optimized, said second base smaller than said first base, said wider base larger than said second base and smaller or equal to said first base.

52. The apparatus of claim 51 wherein said means for converting to a wider base further comprises means for discarding previous conversion results of said third instruction before said converting to a wider base.

53. The apparatus of claim 51, further comprising means for rejecting an expression that cannot be optimized to a smaller base on said second processor.

54. The apparatus of claim 51 wherein said means for converting to a wider base further comprises means for rejecting said first instruction when said wider base is not supported by said second processor.

55. The apparatus of claim 51 wherein said first instruction is arithmetic.

56. The apparatus of claim 51 wherein said first instruction comprises a non-arithmetic, type-sensitive instruction.

57. The apparatus of claim 51, further comprising means for linking each instruction to successor instructions in all control paths.

58. The apparatus of claim 51 wherein
said first processor comprises a Java™ Virtual Machine; and
said second processor comprises a Java Card™ Virtual Machine.

59. The apparatus of claim 51 wherein
said first base is used by said first processor for performing arithmetic operations on at least one data type, said at least one data type having a size less than the size of said first base; and
said second base is used by said second processor for performing arithmetic operations on said at least one data type, said second base having a size equal to the size of said at least one data type.

60. The apparatus of claim 51 wherein
said first base is used by said first processor for performing arithmetic operations on at least one data type, said at least one data type having a size less than the size of said first base; and
said second base is used by said second processor for performing arithmetic operations on said at least one data type, said second base having a size greater than the size of said at least one data type.

61. An apparatus for arithmetic expression optimization, comprising:
at least one memory having program instructions; and
at least one processor configured to use the program instructions to:
receive a first instruction defined for a first processor having a first base, said instruction including an operator and at least one operand; and
convert said first instruction to a second instruction optimized for a second processor having a second base when said at least one operand does not carry potential overflow beyond said second base or when said operator is insensitive to overflow, said second base smaller than said first base.

62. The apparatus of claim 61 wherein said apparatus is further configured to, after said converting said first instruction, return to receiving said first instruction until all instructions defined for said first processor are converted.

63. The apparatus of claim 61, wherein said apparatus is further configured to reject an expression that cannot be optimized to a smaller base on said second processor.

64. The apparatus of claim 61 wherein said first instruction is arithmetic.

65. The apparatus of claim 61 wherein said first instruction comprises a non-arithmetic, type-sensitive instruction.

66. The apparatus of claim 61 wherein said apparatus is further configured to link each instruction to successor instructions in all control paths.

67. The apparatus of claim 61 wherein said apparatus is further configured to convert said first instruction by:
linking each result of an instruction to all instructions that consume said result;
if said converting includes creating a value, linking said value to the instruction that produced said value; and
if said value carries a potential for overflow, linking said value to the instruction that originally caused said overflow.

68. The apparatus of claim 61 wherein
said first processor comprises a Java™ Virtual Machine; and
said second processor comprises a Java Card™ Virtual Machine.

69. The apparatus of claim 61 wherein
said first base is used by said first processor for performing arithmetic operations on at least one data type, said at least one data type having a size less than the size of said first base; and
said second base is used by said second processor for performing arithmetic operations on said at least one data type, said second base having a size equal to the size of said at least one data type.

70. The apparatus of claim 61 wherein
said first base is used by said first processor for performing arithmetic operations on at least one data type, said at least one data type having a size less than the size of said first base; and
said second base is used by said second processor for performing arithmetic operations on said at least one data type, said second base having a size greater than the size of said at least one data type.

71. An apparatus for arithmetic expression optimization, comprising:
at least one memory having program instructions; and
at least one processor configured to use the program instructions to:
receive a first instruction defined for a first processor having a first base, said instruction including an operator and at least one operand; and
convert to a wider base a third instruction that is a source of potential overflow associated with said at least one operand when said at least one operand carries the potential for overflow beyond a second base of a second processor and when said operator is sensitive to overflow, said third instruction having been previously optimized, said second base smaller than said first base, said wider base larger than said second base and smaller or equal to said first base.

72. The apparatus of claim 71 wherein said apparatus is further configured to convert to a wider base comprises discarding previous conversion results of said third instruction before said converting to a wider base.

73. The apparatus of claim 71 wherein said apparatus is further configured to reject an expression that cannot be optimized to a smaller base on said second processor.

74. The apparatus of claim 71 wherein said converting to a wider base further comprises rejecting said first instruction when said wider base is not supported by said second processor.

75. The apparatus of claim 71 wherein said first instruction is arithmetic.

76. The apparatus of claim 71 wherein said first instruction comprises a non-arithmetic, type-sensitive instruction.

77. The apparatus of claim 71 wherein said apparatus is further configured to link further comprising linking each instruction to successor instructions in all control paths.

78. The apparatus of claim 71 wherein
said first processor comprises a Java™ Virtual Machine; and
said second processor comprises a Java Card™ Virtual Machine.

79. The apparatus of claim 71 wherein
said first base is used by said first processor for performing arithmetic operations on at least one data type, said at least one data type having a size less than the size of said first base; and
said second base is used by said second processor for performing arithmetic operations on said at least one data type, said second base having a size equal to the size of said at least one data type.

80. The apparatus of claim 71 wherein
said first base is used by said first processor for performing arithmetic operations on at least one data type, said at least one data type having a size less than the size of said first base; and
said second base is used by said second processor for performing arithmetic operations on said at least one data type, said second base having a size greater than the size of said at least one data type.

81. A smart card having a microcontroller embedded therein, the smart card comprising a virtual machine being executed by a microcontroller, the virtual machine executing a software application comprising of a plurality of previously optimized instructions, the instructions optimized by a method comprising:

receiving a first instruction defined for a first processor having a first base, said instruction including an operator and at least one operand; and converting said first instruction to a second instruction optimized for a second processor having a second base when said at least one operand does not carry potential overflow beyond said second base or when said operator is insensitive to overflow, said second base smaller than said first base;

the virtual machine comprising:

means for receiving optimized instructions, the optimized instructions being previously optimized for execution on a resource-constrained device; and means for executing said instructions.

82. A smart card having a microcontroller embedded therein, the smart card comprising a virtual machine being executed by a microcontroller, the virtualmachine executing a software application comprising of a plurality of previously optimized instructions, the instructions optimized by a method comprising:

receiving a first instruction defined for a first processor having a first base, said instruction including an operator and at least one operand; and converting to a wider base a third instruction that is a source of potential overflow associated with said at least one operand when said at least one operand carries the potential for overflow beyond a second base of a second processor and when said operator is sensitive to overflow, said third instruction having been previously optimized, said second base smaller than said first base, said wider base larger than said second base and smaller or equal to said first base;

the virtual machine comprising:

means for receiving optimized instructions, the optimized instructions being previously optimized for execution on a resource-constrained device; and means for executing said instructions.

* * * * *

UNITED STATES PATENT AND TRADEMARK OFFICE
CERTIFICATE OF CORRECTION

PATENT NO. : 7,316,007 B2 Page 1 of 1
APPLICATION NO. : 10/686513
DATED : January 1, 2008
INVENTOR(S) : Zhiqun Chen and Judith E. Schwabe It is certified that error appears in the above-identified patent and that said Letters Patent is hereby corrected as shown below:

In Column 21, Claim 18, Line 35, replace "Java CardtM" with --Java Card™--.
In Column 28, Claim 82, Line 1, replace "virtualmachine" with --virtual machine--.

Signed and Sealed this

Seventh Day of October, 2008

JON W. DUDAS
*Director of the United States Patent and Trademark Office*